(12) United States Patent
Tsurumi

(10) Patent No.: US 7,057,368 B2
(45) Date of Patent: *Jun. 6, 2006

(54) ELECTRICAL CHARGING SYSTEM, ELECTRICAL CHARGING CONTROLLING METHOD, ROBOT APPARATUS, ELECTRICAL CHARGING DEVICE, ELECTRICAL CHARGING CONTROLLING PROGRAM AND RECORDING MEDIUM

(75) Inventor: Shingo Tsurumi, Saitama (JP)

(73) Assignee: Sony Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/108,033

(22) Filed: Apr. 14, 2005

(65) Prior Publication Data
US 2005/0182515 A1    Aug. 18, 2005

Related U.S. Application Data

(63) Continuation of application No. 10/400,094, filed on Mar. 26, 2003, now Pat. No. 6,914,403.

(30) Foreign Application Priority Data
Mar. 27, 2002   (JP) .............................. 2002-090026

(51) Int. Cl.
*B25J 5/00* (2006.01)

(52) U.S. Cl. .................. 318/568.12; 318/580; 701/25; 701/28

(58) Field of Classification Search ................ 318/587, 318/139, 568.12; 700/245, 145, 165; 180/167; 701/23–25, 28, 50
See application file for complete search history.

(56) References Cited

U.S. PATENT DOCUMENTS

| | | | |
|---|---|---|---|
| 4,638,445 A | | 1/1987 | Mattaboni |
| 4,679,152 A | * | 7/1987 | Perdue ........................ 701/23 |
| 4,777,416 A | | 10/1988 | George et al. |
| 4,933,864 A | * | 6/1990 | Evans et al. ................ 701/207 |
| 4,954,962 A | * | 9/1990 | Evans, Jr. et al. ............ 701/28 |
| 5,040,116 A | * | 8/1991 | Evans, Jr. et al. ............ 701/28 |
| 5,049,802 A | | 9/1991 | Mintus et al. |
| 5,204,814 A | * | 4/1993 | Noonan et al. ............... 701/25 |
| 5,220,263 A | | 6/1993 | Onishi et al. |
| 5,239,249 A | | 8/1993 | Ono |
| 5,280,431 A | | 1/1994 | Summerville et al. |
| 5,321,614 A | * | 6/1994 | Ashworth .................... 701/26 |

(Continued)

FOREIGN PATENT DOCUMENTS

JP          2001 125641         5/2001

(Continued)

*Primary Examiner*—Paul Ip
(74) *Attorney, Agent, or Firm*—Frommer Lawrence & Haug LLP; William S. Frommer; Paul A. Levy

(57) ABSTRACT

A robot apparatus 1 is to be electrically charged autonomously. An electrical charging device 100 is provided with two markers, namely a main marker 118 and a sub-marker 119, and the heights of the markers are pre-stored in the robot apparatus. When the robot apparatus 1 is to find the direction and the distance to the electrical charging device 100, a CCD camera 20 finds the direction vector of the marker from the photographed image. This direction vector is transformed into a position vector of a camera coordinate system {c} and further into a position vector of the robot coordinate system {b}. The coordinate in the height-wise direction in the robot coordinate system {b} is compared to the pre-stored height to find the distance between the markers and the robot apparatus and the direction of the robot apparatus.

1 Claim, 18 Drawing Sheets

U.S. PATENT DOCUMENTS

| | | | |
|---|---|---|---|
| 5,367,456 A | | 11/1994 | Summerville et al. |
| 5,375,059 A | * | 12/1994 | Kyrtsos et al. ............. 701/215 |
| 5,377,106 A | | 12/1994 | Drunk et al. |
| 5,387,853 A | | 2/1995 | Ono |
| 5,390,125 A | * | 2/1995 | Sennott et al. ............. 701/214 |
| 5,477,459 A | * | 12/1995 | Clegg et al. ................ 701/300 |
| 5,812,267 A | * | 9/1998 | Everett et al. .............. 356/614 |
| 5,995,884 A | * | 11/1999 | Allen et al. .................... 701/24 |
| 5,999,866 A | * | 12/1999 | Kelly et al. .................... 701/28 |
| 6,266,442 B1 | * | 7/2001 | Laumeyer et al. .......... 382/190 |
| 6,330,503 B1 | * | 12/2001 | Sharp et al. .................. 701/50 |
| 6,363,161 B1 | * | 3/2002 | Laumeyer et al. .......... 382/104 |
| 6,453,056 B1 | * | 9/2002 | Laumeyer et al. .......... 382/104 |
| 6,496,754 B1 | * | 12/2002 | Song et al. .................. 700/245 |
| 6,529,852 B1 | * | 3/2003 | Knoll et al. ................. 702/150 |
| 6,565,371 B1 | * | 5/2003 | Watanabe .................... 439/138 |
| 2002/0153185 A1 | | 10/2002 | Song et al. |
| 2004/0117079 A1 | * | 6/2004 | Hulden ......................... 701/23 |
| 2005/0046373 A1 | * | 3/2005 | Aldred ......................... 318/580 |
| 2005/0085947 A1 | * | 4/2005 | Aldred et al. ............... 700/253 |

FOREIGN PATENT DOCUMENTS

| | | |
|---|---|---|
| JP | 2002 59389 | 2/2002 |
| JP | 2003 1577 | 1/2003 |
| JP | 2003 79062 | 3/2003 |

* cited by examiner

CAMERA→IMAGE PLANE FOCAL LENGTH f
C: CAMERA COORDINATE (Y: DEPTH)

| | INPUT EVENT NAME | DATA NAME | DATA RANGE | PROBABILITY OF TRANSITION TO OTHER NODE | | | | | |
|---|---|---|---|---|---|---|---|---|---|
| | | | | A | B | C | D | ~ | n |
| node 100 | | | | node 120 | node 120 | node 1000 | | | node 600 |
| NODE OF DESTINATION OF TRANSITION | | | | | | | | | |
| OUTPUT BEHAVIOR | | | | ACTION 1 | ACTION 2 | MOVE BACK | | | ACTION 4 |
| 1 | BALL | SIZE | 0.1000 | 30% | | | | | |
| 2 | PAT | | | | 40% | | | | |
| 3 | HIT | | | | 20% | | | | |
| 4 | MOTION | | | | | | | | |
| 5 | OBSTACLE | DISTANCE | 0.100 | | | 50% | | | |
| 6 | | JOY | 50.100 | | | 100% | | | |
| 7 | | SUPRISE | 50.100 | | | | | | |
| 8 | | SUDNESS | 50.100 | | | | | | |

ELECTRICAL CHARGING SYSTEM, ELECTRICAL CHARGING CONTROLLING METHOD, ROBOT APPARATUS, ELECTRICAL CHARGING DEVICE, ELECTRICAL CHARGING CONTROLLING PROGRAM AND RECORDING MEDIUM

This is a continuation of application Ser. No. 10/400,094, filed Mar. 26, 2003, now U.S. Pat. No. 6,914,403, the entirety of which is incorporated herein by reference.

BACKGROUND OF THE INVENTION

1. Field of the Invention

This invention relates to an electrical charging system, an electrical charging controlling method, a robot apparatus, an electrical charging device, an electrical charging controlling program, and a recording medium. This application claims priority of Japanese Patent Application No. 2002-090026, filed on Mar. 27, 2002, the entirety of which is incorporated by reference herein.

2. Description of Related Art

Recently, development in practically useful robots, supporting the human life as a partner, that is supporting the human activities in various aspects of our everyday life, such as in living environment, is progressing. In distinction from the industrial robots, these practically useful robots are endowed with the ability to learn for themselves the method for adaptation to human beings with variable personalities, or to variable environments, in the variegated aspects of our everyday life. For example, pet-type robots, simulating the bodily mechanism or movements of animals, such as quadruples, e.g., dogs or cats, or so-called humanoid robots, simulating the bodily mechanism or movements of animals erected and walking on feet, such as human beings, are already being put to practical use.

As compared to the industrial robots, the above-described robot apparatus are able to perform variable entertainment-oriented operations, and hence are sometimes called entertainment robots.

Meanwhile, since the above-described pet type robot or the humanoid robot behaves autonomously, it is connected with for example a cable to a power supply, and hence the driving of the robot apparatus proves hindrance to the behavior of the robot apparatus. In this consideration, such robot apparatus includes an built-in battery, as a power supply source.

However, since the quantity of the power that can be stored in the battery is limited, it is necessary with the conventional robot apparatus to charge the battery periodically. If this periodic charging is not made, the behavior of the robot apparatus no longer occurs due to battery power down. Moreover, this periodic battery charging is cumbersome for the user.

SUMMARY OF THE INVENTION

It is therefore an object of the present invention to provide an electrical charging system and an electrical charging controlling method for a robot apparatus, in which electrical charging may take place autonomously, a robot apparatus, an electrical charging device, an electrical charging controlling program, and a recording medium.

It one aspect, the present invention provides an electrical charging system including a robot apparatus and an electrical charging device, the robot apparatus having built-in a power supply unit for driving and adapted for acting autonomously responsive to an inner state, with the electrical charging device electrically charging the power supply unit, wherein the electrical charging device includes a marker provided at a predetermined position, the robot apparatus including imaging means for imaging a surrounding state, storage means having the information on the position of the marker pre-stored therein, position vector calculating means for calculating the distance and the direction to the marker from the information on the marker position stored in the storage means and from an image including the marker position, photographed by the imaging means, and operation controlling means for performing control for causing movement of the robot apparatus towards the electrical charging device depending on the distance and the direction to the marker calculated by the position vector calculating means.

In another aspect, the present invention provides a robot apparatus including imaging means for imaging a surrounding state, storage means having the information on the position of a marker provided to an electrical charging device electrically charging the power supply unit, position vector calculating means for calculating the distance and the direction to the marker from the information on the marker position stored in the storage means and from an image including the marker position, photographed by the imaging means, and operation controlling means for performing control for causing movement of the robot apparatus towards the electrical charging device depending on the distance and the direction to the marker calculated by the position vector calculating means.

In still another aspect, the present invention provides an electrical charging device for a robot apparatus having a charging battery comprising an outer casing, the height of which is gradually decreased from one longitudinal end to the opposite side longitudinal end thereof, connection means electrically connected to the robot apparatus for supplying at least the electrical power, and a marker recognizable by the robot apparatus.

Preferably, at least two of the markers are provided at different positions of the electrical charging device, and the storage means having stored therein the position relationships of said markers and the mounting positions thereof to the electrical charging device.

In still another aspect, the present invention provides an electrical charging controlling method including an imaging step of imaging a surrounding state, storage means having the information on the position of the marker pre-stored therein, a position vector calculating step of calculating the distance and the direction to the marker from an image of the marker provided to en electrical charging device, photographed by the imaging step, and from information on the position of the marker pre-stored in storage means, and a movement controlling step of performing control for causing movement of the robot apparatus towards the electrical charging device depending on the distance and the direction to the marker calculated by the position vector calculating step.

The present invention also provides a control program for having the robot apparatus carry out the electrically charging controlling method, and a recording medium having recorded this control program.

The electrical charging system of the present invention includes an electrical charging device including a marker provided at a predetermined position, with the robot apparatus including imaging means for imaging a surrounding state, storage means having the information on the position of the marker pre-stored therein, position vector calculating means for calculating the distance and the direction to the marker from the information on the marker position stored in the storage means and from an image including the marker position, photographed by the imaging means, and operation controlling means for performing control for causing movement of the robot apparatus towards the electrical charging device depending on the distance and the direction to the marker calculated by the position vector calculating means.

Thus, with the electrical charging system according to the present invention, it is possible for the robot apparatus to locate the electrical charging device and to be moved towards the electrical charging device to carry out electrical charging autonomously.

With the robot apparatus according to the present invention, the position vector calculating means calculates the distance and the direction to the marker, based on the marker position information stored in the storage means, and the image including the marker position, photographed by the imaging means, and accordingly locates the electrical charging device to proceed towards it to carry out autonomous charging.

With the robot apparatus according to the present invention, the robot apparatus has the visually recognizable marker, whereby the position of the electrical charging device can be recognized by the robot apparatus.

Moreover, with the electrical charging controlling method according to the present invention, the distance and the direction to the marker provided to the electrical charging device, are calculated from the image of the marker photographed in the imaging step, and from the information on the marker position pre-stored in the storage means, in the position vector calculating step, and the robot apparatus is controlled to be moved towards the electrical charging device, depending on the distance and the direction calculated, in the operation controlling step, the robot apparatus locating the electrical charging device and proceeding towards the electrical charging device to effect electrical charging autonomously.

By recording the control program for having a robot apparatus execute the electrical charging controlling method on a recording medium, and by providing this recording medium, it is possible for the robot apparatus to locate the electrical charging device to proceed towards the electrical charging device to effect electrical charging autonomously.

BRIEF DESCRIPTION OF THE DRAWINGS

FIG. 18 shows status transition conditions for determining the behavior of the robot apparatus.

DESCRIPTION OF THE PREFERRED EMBODIMENTS

The electrical charging system according to the present invention is made up by a robot apparatus, having a built-in power supply and which is able to act autonomously responsive to its inner state, and an electrical charger for electrically charging a power supply. In this electrical charging system, the robot apparatus performs autonomous movements towards the electrical charger to start the electrical charging automatically. The robot apparatus is able to recognize the position of the electrical charger because the electrical charger is provided with a marker. The robot apparatus memorizes the position of this marker and finds the direction and the distance to the electrical charger from the photographed image of the marker and the pre-stored marker position.

Figure 1:
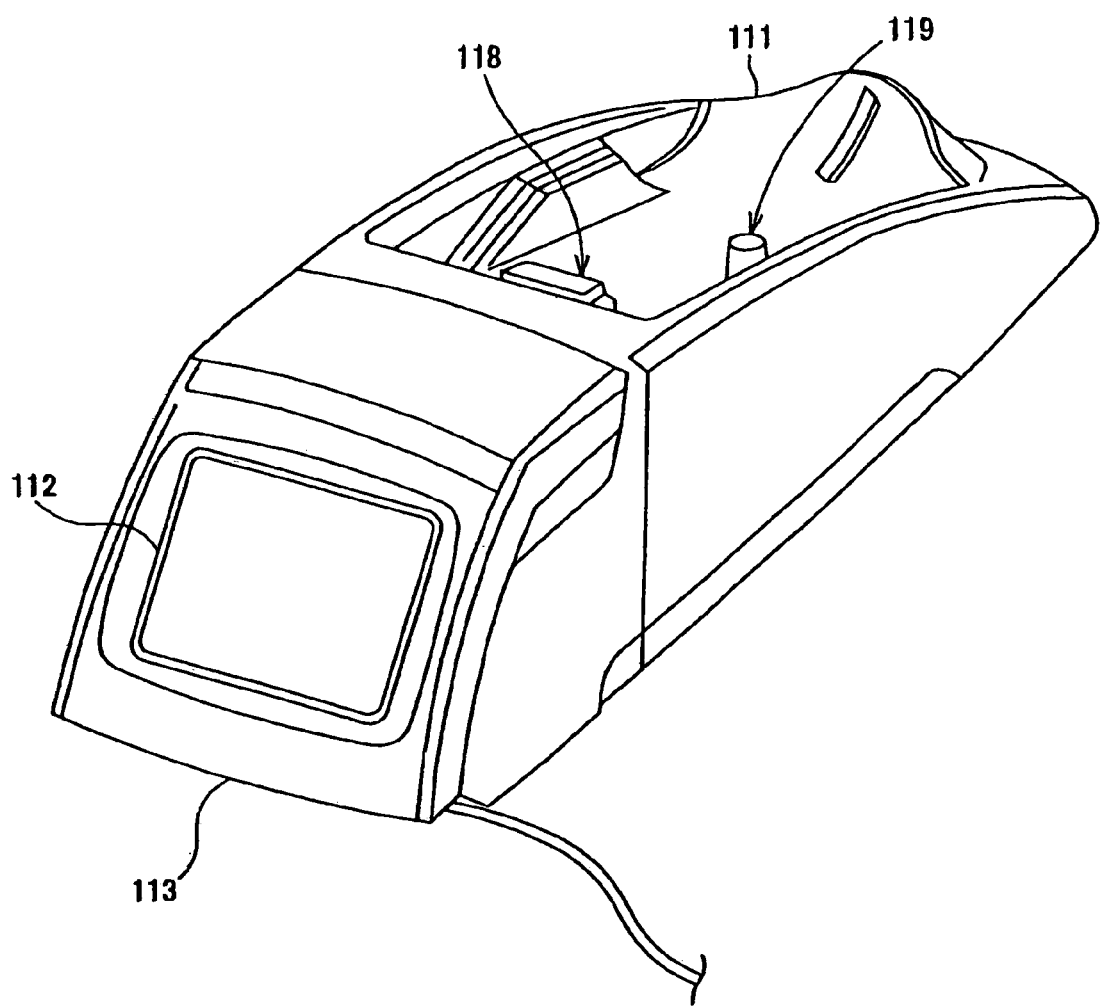
FIG. 1 is a perspective view showing an electrical charger embodying the present invention.
Figure 2:
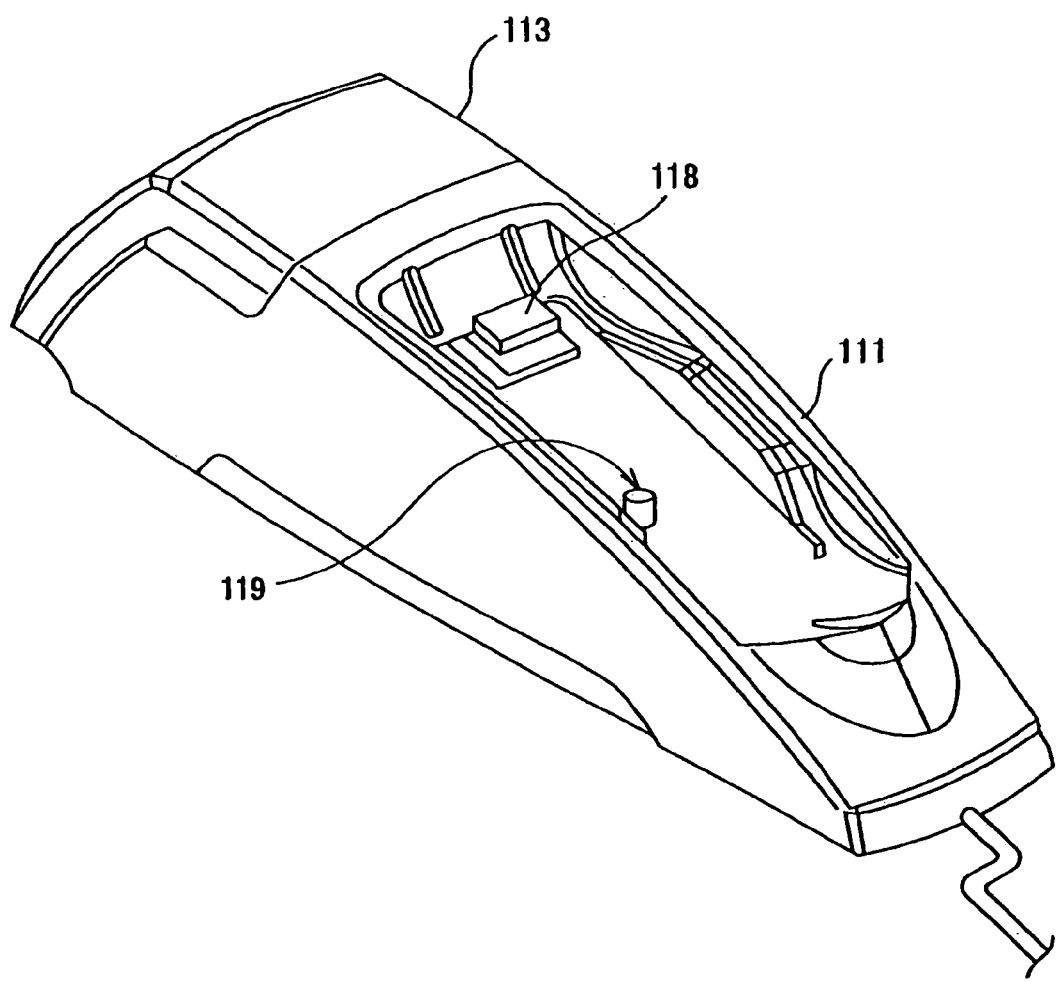
FIG. 2 is a perspective view showing another electrical charger embodying the present invention.
Figure 3:
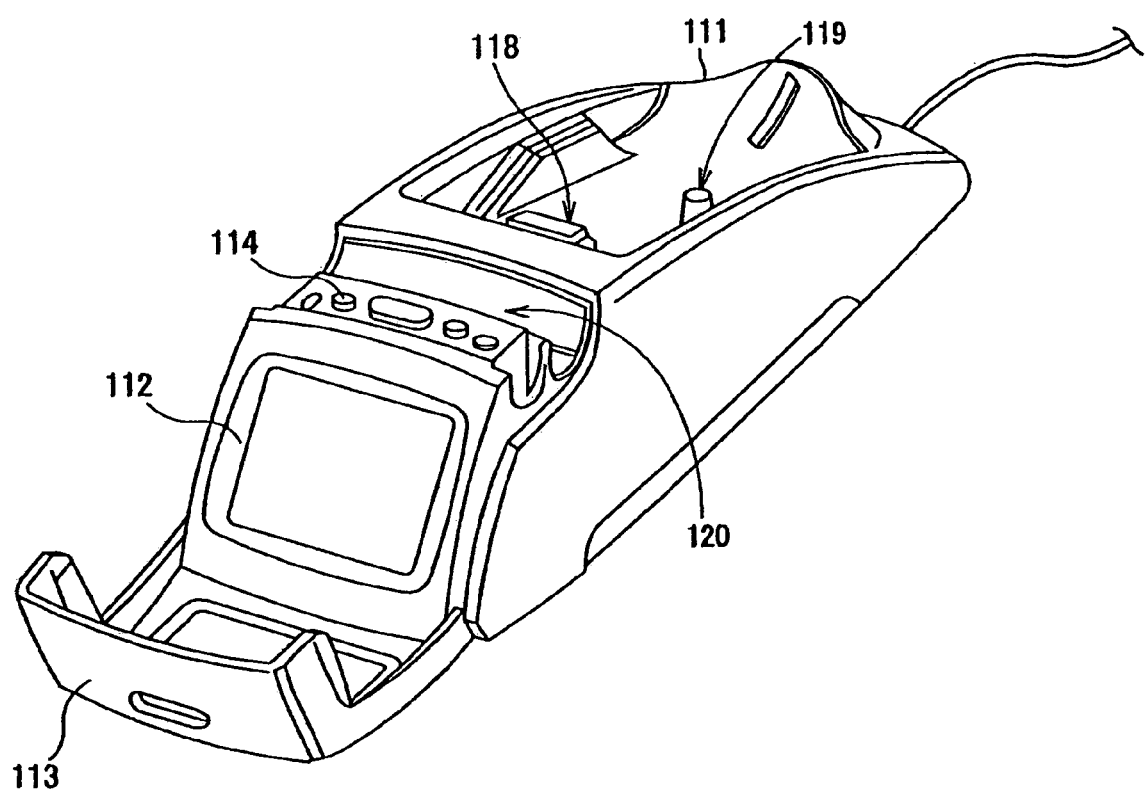
FIG. 3 is a perspective view showing still another electrical charger embodying the present invention.

In the present embodiment, the structure of the electrical charger 100 is explained first and subsequently the robot apparatus is explained in detail. Referring to FIGS. 1 to 3, an illustrative structure of the electrical charger 100 according to the present invention is explained in detail.

The electrical charger 100 includes a robot apparatus support 111, on which to load the robot apparatus 1, a display unit 112 for demonstrating e.g., the electrical charging state of the robot apparatus, a front cover 113 for partially covering the display unit 112, an operating unit 114, and a main marker 118 and a sub-marker 119, as indices for indicating the presence of the electrical charger.

The electrical charger 100 is formed as a semi-droplet shaped device, the height of which is lowered gradually along a curved surface from one longitudinal end to the other longitudinal end of the electrical charging device. The display unit 112 is provided with an end face of a higher height. The surface of the electrical, charger 100 provided with the display unit 112 is termed a front surface, while the lowered end thereof is termed a rear end.

The highest point of the electrical charger 100 is of approximately the same height as that up to the belly of the robot apparatus 1 upstanding still on its four legs. The transverse length of the electrical charger 100 is selected to be less than the length between left and right legs of the robot apparatus 1.

In the electrical charger 100, the robot apparatus support 111 is shaped as a bowl lying along the belly of the robot apparatus 1. The electrical charger 100 is provided with a connection unit 115 and a loading detection unit 116 on the major surface of the robot apparatus support 111.

The connection unit 115 is provided to a position corresponding to a mating connection unit provided on the robot apparatus 1 when the robot apparatus 1 is loaded in position. The connection unit 115 has the function as a connector for power supply and information exchange, in a manner not shown. When the robot apparatus 1 is set on the electrical charger, the connection unit 115 is contacted with the mating connection unit provided on the robot apparatus 1 to supply the power to the robot apparatus 1. The connection unit 115 also receives the information on the electrically charging by the charging battery loaded on the robot apparatus 1 or the information on the inner state thereof.

The loading detection unit 116 is mounted at a position contacted by the robot apparatus 1 when the robot apparatus 1 is mounted on the electrical charger. The loading detection unit 116 is protruded in a perpendicular direction to the major surface of the robot apparatus support 111 and is elastically biased in the protruding direction, so that, when the robot apparatus 1 is mounted on the robot apparatus support 111, the loading detection unit is pushed into the inside of the electrical charger 100 by the belly portion of the robot apparatus 1. Thus, a loading detection device 119 detects that the robot apparatus 1 has been placed in position. On detecting that the robot apparatus 1 has been loaded in position, the loading detection device 119 commences electrical charging to acquire the information on the inner state of the robot apparatus 1.

The display unit 112 is e.g., a liquid crystal display and demonstrates at least the information on the electrical charging of the charging battery mounted on the robot apparatus 1, the information on the inner state of the robot apparatus 1 acquired through an information exchange connector, and other various information. The display unit 112 also demonstrates the information on the electrical charging of a charging battery as a sub-battery charged in a charging unit 117 as later explained.

The front cover 113 includes an opening in a portion corresponding to the display unit 112 on the front surface. The front cover 113 is formed as a subsequently L-shaped section for overlying the operating unit 114 and display means provided on an upper surface.

The front cover 113 is mounted to a preset location near the bottom surface of the electrical charger 100 and may be opened/closed on a line of extension of the longitudinal direction of the main body unit of the electrical charger 100.

The operating unit 114, used, for example, for selecting the function of the electrical charger 100, is mounted on the upper surface thereof. Next to the operating unit 114, there is mounted the electrical charging unit 117 for electrically charging the charging battery as a sub-battery.

Figure 4:
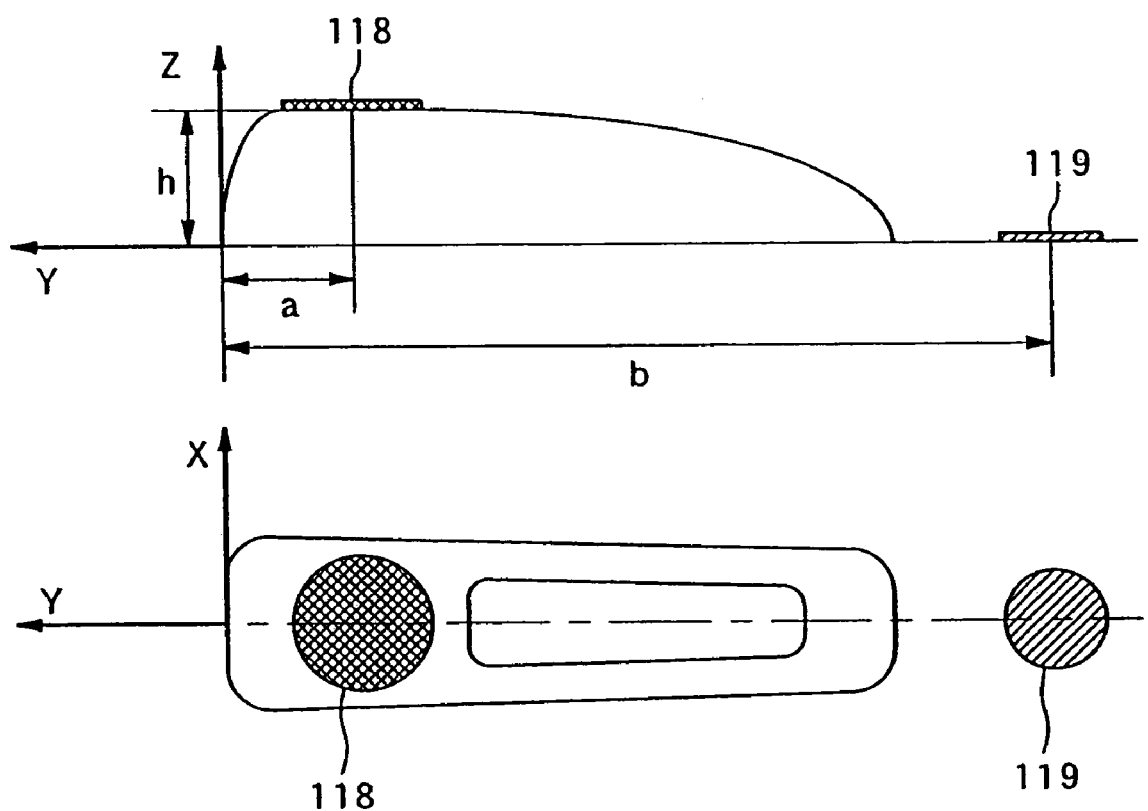
FIG. 4 is a schematic view showing yet another electrical charger embodying the present invention.

FIG. 4 schematically shows the upper and lateral sides of the electrical charger 100. As shown in FIG. 4, two markers, namely a main marker 118 and a sub-marker 119, are provided to the electrical charger 100. The main marker 118 is mounted at the uppermost location of the electrical charger 100 so that it can be seen readily from the neighboring area. The height h of the uppermost point of the electrical charger 100 and the distance a from the distal end of the electrical charger 100 to the main marker 118 are recorded in the robot apparatus 1 for use in calculating the distance between the robot apparatus 1 and the electrical charger 100. The color of the main marker 118 is not a routine color such that the site of the main marker 118 can be recognized by the robot apparatus 1 detecting the color.

The sub-marker 119 is provided at the rear end of the electrical charger 100. The color of the sub-marker 119 is also not a routine color such that the site of the sub-marker 119 can be recognized by the robot apparatus 1 detecting the color. The distance from the distal end of the electrical charger 100 to the sub-marker 119 is recorded on the robot apparatus 1 for use in calculating the relative distance and the relative angle between the station coordinate system {s} and the robot coordinate system {b} and in detecting possible mistaken marker recognition.

Figure 5:
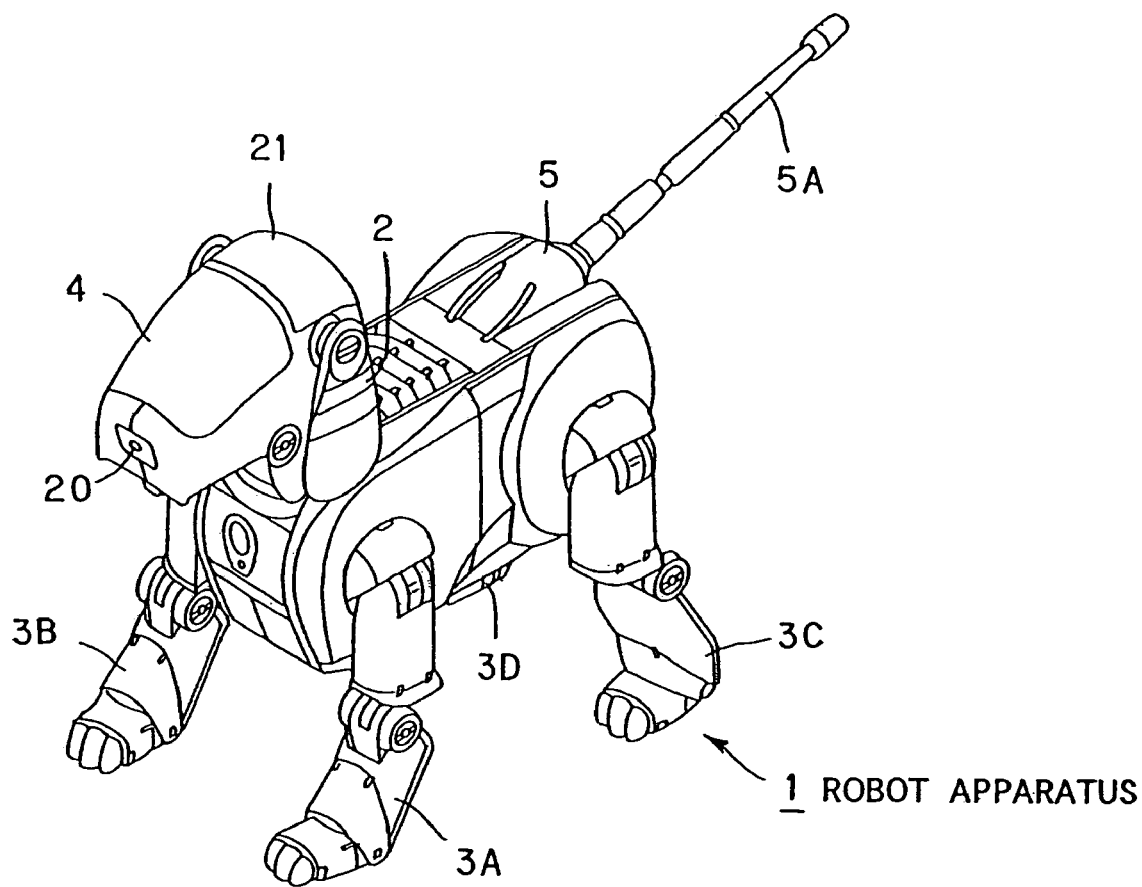
FIG. 5 is a perspective view showing a robot apparatus embodying the present invention.

The robot apparatus 1 is now explained. Referring to FIG. 5, leg units 3A to 3D are connected to the front and rear sides and to the left and right sides of a body trunk unit 2. A head unit 4 and a tail unit 5 are connected to the front and rear sides of the body trunk unit 2, respectively.

Figure 6:
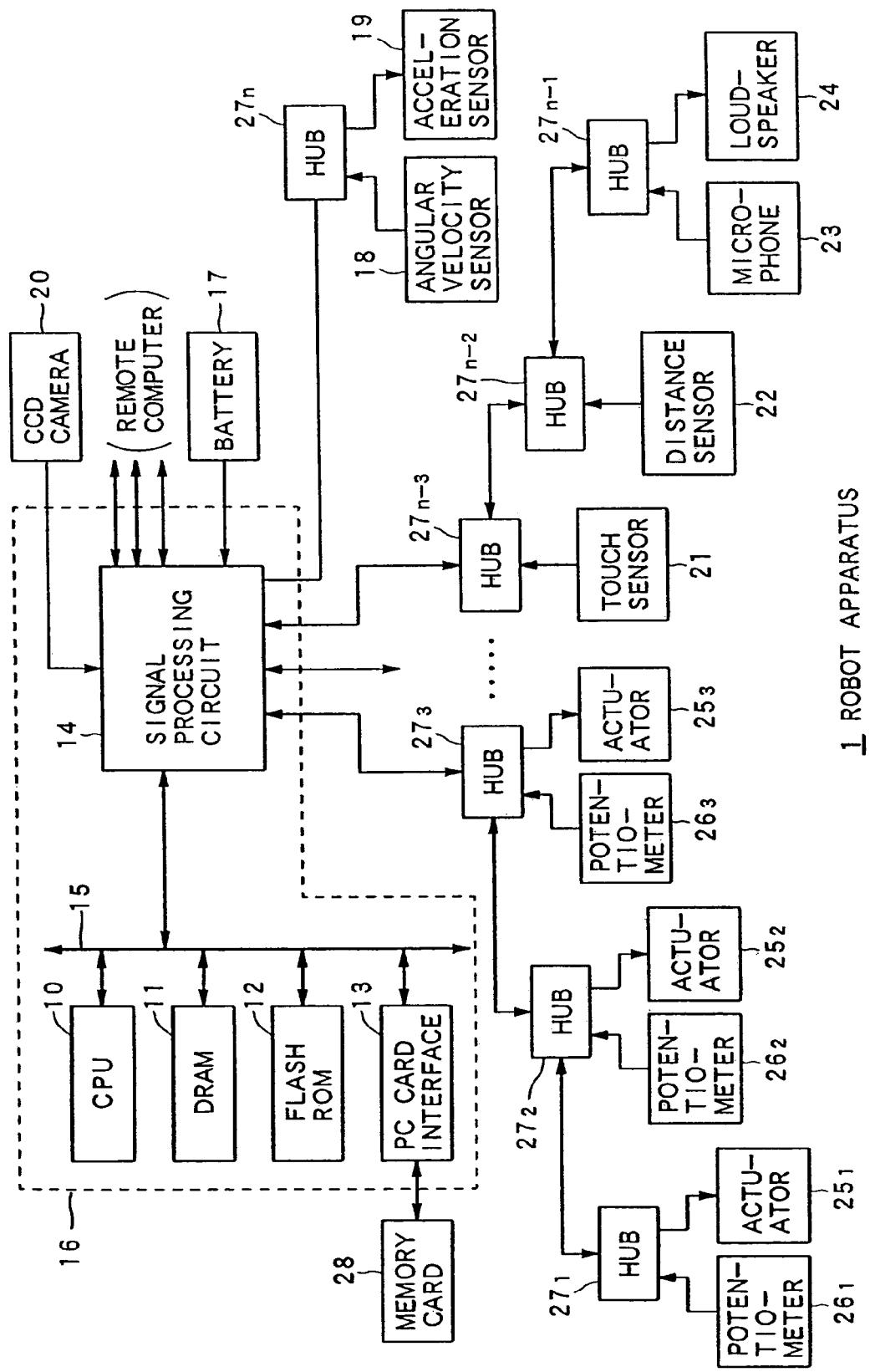
FIG. 6 shows an inner structure of the robot apparatus embodying the present invention.

Referring to FIG. 6, the body trunk unit 2 is provided with a control unit 16 and a battery 17. The control unit 16 is formed by a CPU (central processing unit) 10, a DRAM (dynamic random access memory) 11, a flash ROM (read-only memory) 12, a PC (personal computer) card interfacing circuit 13 and a signal processing circuit 14, interconnected over an internal bus 15. The battery 17 is a power supply unit for the robot apparatus 1 that can be charged/discharged repeatedly. In the body trunk unit 2, there are stored an angular velocity sensor 18 and an acceleration sensor 19 for sensing the orientation or the motion acceleration of the robot apparatus 1.

In preset locations of the head unit 4, there are mounted a CCD (charged-coupled device) camera 20 for imaging an external state, a touch sensor 21 for detecting the pressure applied by physical actions, such as [stroking] or [patting] from the user, a distance sensor 22 for measuring the distance to a forwardly situated object, a microphone 23 for collecting the external sound, a loudspeaker 24 for outputting the sound, such as pet's singing, and an LED (light emitting diode), not shown; equivalent to an 'eye' of the robot apparatus 1.

The joint portions of the leg units 3A to 3D, connecting portions between the leg units 3A to 3D and the body trunk unit 2 and the connecting portions between the head unit 4 and the body trunk unit 2, are provided with a number of actuators $25_1$ to $25_n$ and a number of actuators $26_1$ to $26_n$ corresponding to the number of the required degrees of freedom. Each of the actuators $25_1$ to $25_n$ is provided with for example a servo motor. Thus, the robot apparatus 1 may take a targeted orientation or perform targeted movements by the leg units, head unit 4 and the tail unit 5 being controlled by the driving of the servo motor.

The aforementioned various sensors, such as angular velocity sensor 18, acceleration sensor 19, touch sensor 21, distance sensor 22, microphone 23, loudspeaker 24 or the potentiometers, and the actuators, are connected via associated hubs $27_1$ to $27_n$ to the signal processing circuit 14 of the control unit 16. The CCD camera 20 and the battery 17 are directly connected to the signal processing circuit 14.

The signal processing circuit 14 sequentially takes in sensor data, image data or audio data, supplied from the above-mentioned respective sensors, to store these data sequentially in preset locations in the DRAM 11 over the internal bus 15.

The signal processing circuit 14 sequentially takes in the residual battery data, specifying the residual power to be supplied from the battery 17, to store the data in preset locations in the DRAM 11.

The sensor data, image data, audio data and the residual battery data, thus stored in the DRAM 11, are used when the CPU 10 performs operational control of the robot apparatus 1.

In an initial state when the power supply of the robot apparatus 1 is turned on; the CPU 10 reads out the control program stored in the flash ROM 12 for storage in the DRAM 11. Alternatively, the CPU 10 reads out the control program stored in a semiconductor memory device loaded in a PC card slot of the body trunk unit 2, not shown, such as in a so-called memory card 28, through a PC card interfacing circuit 13, for storage in the DRAM 11.

The CPU 10 checks its own state, surrounding state, commands or actions from the user, based on the sensor data, image data, audio data and the residual battery data, thus stored in the DRAM 11 from the signal processing circuit 14, as described above.

Additionally, the CPU 10 determines the behavior which is based on the results checked and on the control program stored in the DRAM 11. The CPU 10 causes the necessary one(s) of the actuators $25_1$ to $25_n$, based on the determined results, to cause the head unit 4 to be swung in the up-and-down direction or in the left-and-right direction, to cause the tail of the tail unit 5 to be moved, or to cause the leg units 3A to 3D to walk.

The CPU 10 also generates speech data, if necessary, to send the so generated speech to the loudspeaker 24 through the signal processing circuit 14. The CPU 10 also generates signals instructing on/off of the LED to turn the LED on or off. That is, the robot apparatus 1 behaves autonomously, responsive to the own or surrounding states, or commands or actions from the user.

Since the robot apparatus 1 is able to behave autonomously, the movements of the robot apparatus 1 are obstructed if an electrical conducting line is connected to the robot apparatus 1 for supplying the power thereto. Thus, the robot apparatus 1 is built-in the battery 17, as shown in FIG. 6, and is actuated by the power supplied from this battery 17. It is noted that the battery 17 is electrically charged by the above-described electrical charger 100.

The robot apparatus 1 also has the automatic charging function, which is the function the robot apparatus 1 has for autonomously finding the electrical charger 100 when the residual battery capacity is about to be depleted, and for performing the electrically charging operation for itself.

For executing this automatic charging function, a program concerning automatic charging is stored in a storage device, such as the memory card 28. The CPU 10 executes the automatic charging in accordance with the operational sequence provided by this program. The processing for automatic charging in the present embodiment of the robot apparatus 1 is now explained specifically.

The processing for automatic charging is made up by a main marker search processing for finding the main marker 118 provided at the uppermost point of the electrical charger 100, a sub-marker search processing for finding the sub-marker 119 provided at the rear end of the electrical charger 100, a distance calculating processing for calculating the distance between the two markers 118, 119 and the robot apparatus 1, relative position calculating means for calculating the relative position/angle between the charger 100 and the robot apparatus 1, and a path determining processing for determining the path to an entrance point of the electrical charger 100.

In the main marker search processing, the robot apparatus 1 actuates its four limbs or neck to take in surrounding images to retrieve whether or not there is contained the color information of the main marker 118 in the thus taken-in image information, to recognize the presence of the main marker 118. The robot apparatus 1, which has recognized the presence of the main marker 118, actuates the neck or the four limbs of the robot apparatus 1 to place the main marker 118 at the center of the image.

The distance calculating processing is the processing of calculating the distance between the markers 118, 119 and the robot apparatus 1. In the distance calculating processing, the robot apparatus 1 sets four coordinate systems, namely a station coordinate system {s}, centered about the electrical charger 100, a robot coordinate system {b}, centered about the trunk of the robot apparatus 1, a camera coordinate system {c}, centered about the CCD camera 20 provided to the head unit of the robot apparatus 1, and an imaging coordinate system {i}, having the center of the image photographed by the CCD camera 20 as a point of origin. The height BCz from the point of origin B of the robot coordinate system {b} to the camera coordinate system {c}, and a coordinate transformation matrix $A_{CB}$ from the camera coordinate system {c} to the robot coordinate system {b}, are calculated and substituted into the following equation (1), to calculate the distance between the robot apparatus and the markers:

$$\alpha = \frac{SP_{s1x} - BC_z}{A_{CB31}\frac{1}{f}h_1 + A_{CB32} + A_{CB33}\frac{1}{f}v_1} \quad (1)$$

where SPs1x is the distance from the point of origin S of the station coordinate system {s} to a center Ps1 of the main marker along the y-axis, this value being pre-recorded in the robot apparatus 1 as the distance a shown in FIG. 4.

Figure 7:
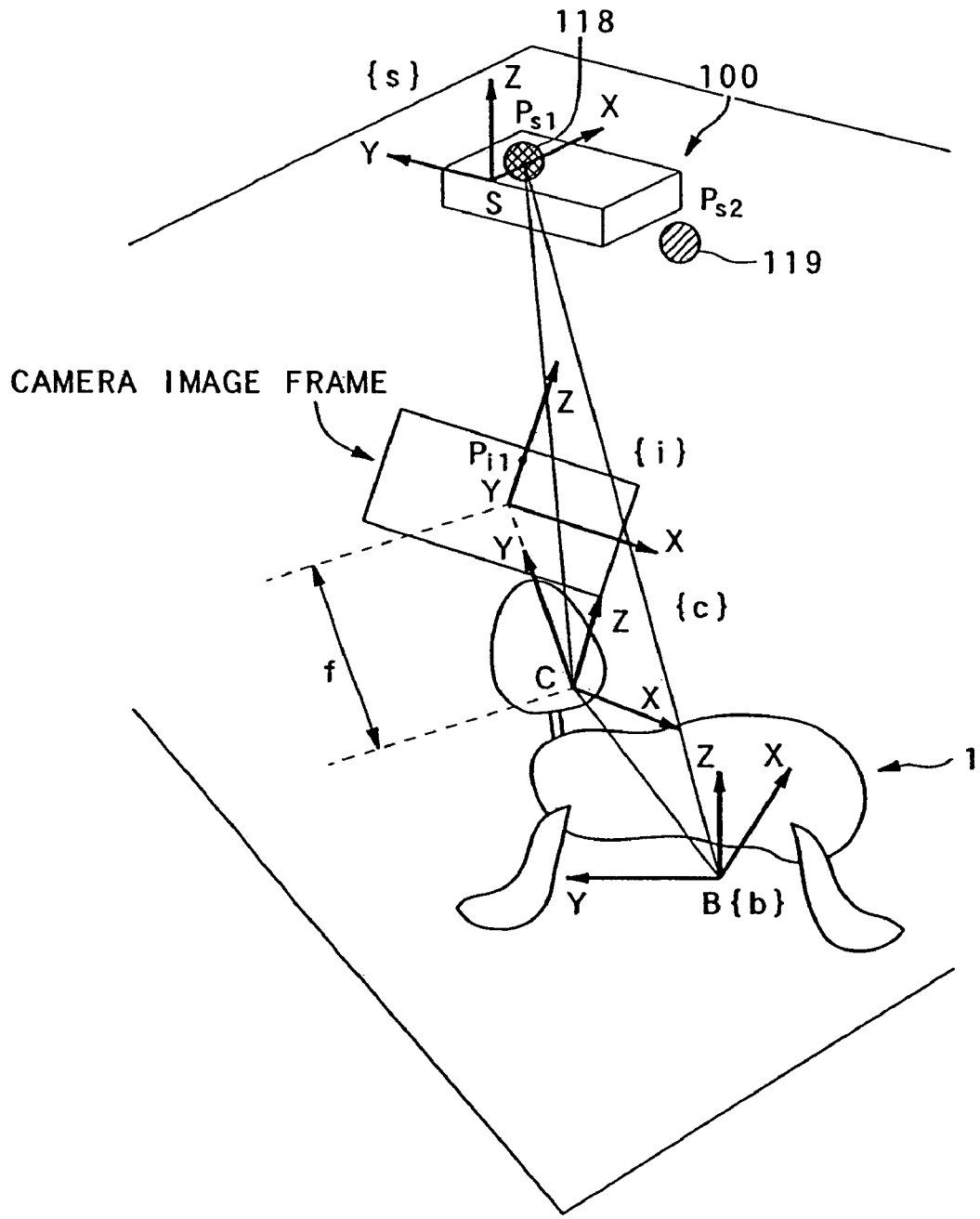
FIG. 7 is a schematic view showing a coordinate system used in automatic electrical charging.

This equation is calculated in accordance with the following algorithm: First, the above-described coordinate system is explained specifically by referring to the drawings. FIG. 7 shows the four coordinate systems with the electrical charger 100 and the robot apparatus 1 placed on a planar floor. The station coordinate system {s} has a point of the electrical charger 100 as the point of origin S. The x and y coordinates are set on the floor where the electrical charger 100 is arranged, with the z coordinate being the height from the floor. The robot coordinate system {b} has a point of intersection of a plumb line drawn from the center of gravity of the robot as the point of origin B. The x and y coordinates are set on the floor, with the z coordinate being the height from the floor. Thus, the xy plane of the station coordinate system {s} is the same as the xy plane of the of the robot coordinate system {b}, such that, even if the coordinate transformation of the station coordinate system {s} and that of the robot coordinate system {b} are made, the value of the z coordinate is not changed.

The camera coordinate system {c} has the CCD camera 20, mounted on the head unit of the robot apparatus, as the point of origin C, with the viewing axis of the CCD camera 20 being the y-axis. The imaging coordinate system {i} is two-dimensional coordinates set on an image photographed by the CCD camera 20, and has the center of the photographed image as the point of origin I.

The algorithm for calculating the above equation (1) is explained. In this algorithm, the distance to a marker is set to α, and the directional vector of the marker in the imaging coordinate system {i} is multiplied by this distance α to presume the position vector of the marker. An equation indicating the z-component (height of the marker) at this time and an equation of the height h of the marker pre-stored in the robot apparatus are formulated. The equation (1) for calculating the distance α between the marker and the robot apparatus is found by term transposition of the equation indicating the z-component.

The algorithm for finding the distance to the main marker 118 is now explained specifically. It should be noted that the algorithm for calculating the distance of the main marker 118 is identified with the algorithm for calculating the distance to the sub-marker 119, so that the algorithm for calculating the distance to the sub-marker 119 may be derived by changing the symbol Ps1 indicating the center position of the main marker 118 to the symbol Ps2 indicating the center position of the sub-marker 119. Thus, the explanation of the algorithm for calculating the distance of the sub-marker 119 is omitted.

First, if the coordinate of the center Ps1 of the main marker 118 in the camera coordinate system {c} is (xc1, yc1, zc1), the directional vector CPs1 from the point of origin C of the camera coordinate system to the center Ps1 of the main marker 118 is expressed by the following equation (2):

component of the [C] system of the directional vector of $CP_{s1}$ $$CP_{s1} = \begin{bmatrix} \frac{x_{c1}}{y_{c1}} & 1 & \frac{z_{c1}}{y_{c1}} \end{bmatrix}^T. \quad (2)$$

If the x and z coordinates of Ps1 of the main marker 118 in the imaging coordinate system {i} are h1, v1, respectively, the xz component of the directional vector CPs1 is transformed as indicated by the following equation (3):

$$\frac{x_{c1}}{y_{c1}} = \frac{1}{f} h_1 \quad (3)$$
$$\frac{z_{c1}}{y_{c1}} = \frac{1}{f} v_1.$$

If, with the distance α from the point of origin C of the camera coordinate system {c} to the center Ps1 of the main marker 118, the vector CPs1 proceeding from the point of origin C of the camera coordinate system {c} to the center Ps1 of the main marker 118 is to be expressed, this vector may be expressed by the following equation (4):

$$\vec{CP}_{s1} = \alpha \begin{bmatrix} \frac{x_{c1}}{y_{c1}} & 1 & \frac{z_{c1}}{y_{c1}} \end{bmatrix}^T = \alpha \begin{bmatrix} \frac{1}{f} h_1 & 1 & \frac{1}{f} v_1 \end{bmatrix}^T. \quad (4)$$

The position vector CPs1, indicating the center Ps1 of the main marker 118 in the camera coordinate system {c}, is transformed into the position vector BPs1, indicating the center Ps1 of the main marker 118 in the robot coordinate system {b}, by the following equation (5):

$$\vec{SP}_{s1} = [SP_{s1x} \ SP_{s1y} \ SP_{s1z}] = A_{BS} \vec{BP}_{s1} \quad (5)$$

where the vector BC is the position vector indicating the point of origin C of the camera coordinate system {c} in the robot coordinate system. {b} and $A_{CB}$ is a coordinate transformation matrix from the camera coordinate system {c} into the robot coordinate system {b}, as calculated from the angle of the joints of the robot apparatus 1.

The equation (5), expressed by a matrix, is as shown in the following equation (6):

$$\begin{bmatrix} SP_{s1x} \\ SP_{s1y} \\ SP_{s1z} \end{bmatrix} = \begin{bmatrix} A_{BS11} & A_{BS12} & 0 \\ A_{BS21} & A_{BS22} & 0 \\ 0 & 0 & 1 \end{bmatrix} \quad (6)$$

$$\left( \begin{bmatrix} BC_x \\ BC_y \\ BC_z \end{bmatrix} + \alpha \begin{bmatrix} A_{CB11} & A_{CB12} & A_{CB13} \\ A_{CB21} & A_{CB22} & A_{CB23} \\ A_{CB31} & A_{CB32} & A_{CB33} \end{bmatrix} \begin{bmatrix} \frac{1}{f} h_1 \\ 1 \\ \frac{1}{f} v_1 \end{bmatrix} \right).$$

On solving the equation (6), the z-component of the vector SPs1 is as shown by the following equation (7):

$$SP_{s1x} = BC_x + \alpha \left\{ A_{CB31} \frac{1}{f} h_1 + A_{CB32} + A_{CB33} \frac{1}{f} v_1 \right\}. \quad (7)$$

By solving the equation (7) for α, the equation (1) may be calculated. As mentioned previously, the respective terms of the equation (1) are of pre-known values, or of values calculated from the joint angles of the robot apparatus 1 or from the image information of the CCD camera 20. The distance α between the robot apparatus and the marker may be calculated by substituting these values into the equation (1).

The processing for calculating the sub-marker is executed using the distance information calculated by the distance calculating processing. As mentioned previously, the main marker 118 is provided at the uppermost point of the electrical charger 100 and hence may readily be found by the robot apparatus 1. However, the sub-marker 119 is provided to the rear end of the robot apparatus and hence is hidden in the shade of the electrical charger 100 so that the sub-marker may not be within the viewing field of the CCD camera 20 of the robot apparatus 1. Thus, in the sub-marker detection processing, the robot apparatus 1 is made to walk round the main marker 118 to search for the sub-marker 119.

In searching for the sub-marker 119, the robot apparatus 1 is caused to make the round of the main marker 118 to delineate a regular octagonal shape there around in the counterclockwise direction to shoot an image at each apex of the regular octagon to search whether or not the color information proper to the sub-marker 119 is included in the image information. The procedure of causing the robot apparatus 1 to walk to delineate the shape of a regular octagon is as follows: On finding the main marker 118, the robot apparatus 1 searches whether or not the color information proper to the sub-marker 119 is contained in the image information. If the color information proper to the sub-marker 119 is contained in the image information, the processing for searching the sub-marker is terminated.

If the image of the sub-marker 119 is not included in the photographed image of the main marker 118; movement to an apex point of the regular octagon is initiated. The robot apparatus 1, which has initiated its movement towards the apex points of the regular octagon, performs a turning movement so that the body of the robot apparatus 1 is oriented towards the main marker 118. The distance between the main marker 118 and the robot apparatus 1 is calculated by distance calculating processing and the robot apparatus 1 is moved in the back-and-forth direction until a preset distance is reached. Moreover, the robot apparatus 1 turns its body 67.5° in the clockwise direction and performs an advancing movement a distance equal to the length of a side of the octagon for moving to the apex point of the octagon.

On getting to the apex point of the octagon, the robot apparatus 1 moves its four limbs and neck to photograph surrounding images to search whether or not the color information proper to the main marker 118 is contained in the image information. If the presence of the main marker 118 is recognized, it is checked whether or not the color information proper to the sub-marker 119 is included in the image containing the main marker 118. If there is no color information proper to the sub-marker 119 in the image containing the main marker 118, the robot apparatus 1 moves to the next apex point to search a location where the main marker 118 and the sub-marker 119 are included in one and the same image. The robot apparatus 1 reiterates this sequence of operations. When the robot apparatus has moved to the location where the main marker 118 and the sub-marker 119 are included in one and the same image, the sub-marker search processing is terminated.

Figure 8:
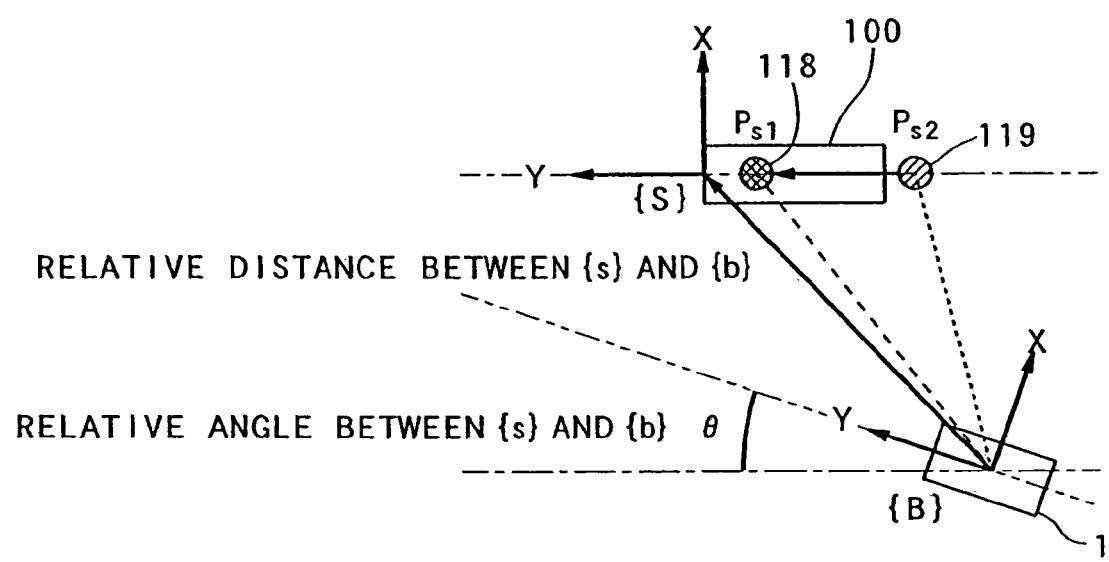
FIG. 8 shows the relative distance and the relative angle of a robot coordinate system and a station coordinate system.

On finding the sub-marker, the robot apparatus performs the processing of calculating the relative position. This processing of calculating the relative position is the processing of calculating the relative position/angle between the station coordinate system $\{s\}$ and the robot coordinate system $\{b\}$. FIG. 8 shows the relative position/angle between the station coordinate system $\{s\}$ and the robot coordinate system $\{b\}$. Referring to FIG. 8, the relative position is the position vector from the point of origin B of the robot coordinate system $\{b\}$ to the station coordinate system $\{s\}$, while the relative angle is the angle of rotation $\theta$ of the coordinate systems, namely the station coordinate system $\{s\}$ and the robot coordinate system. $\{b\}$.

In the relative position calculating means, the robot apparatus 1 first finds the positions vectors BPs1 and BPs2 of the main marker and the sub-marker, using the distance calculating processing. The relative position/angle of the point of origin B of the robot coordinate system $\{b\}$ and the point of origin S of the station coordinate system $\{s\}$ is then found by substituting the position vectors BPs1 and BPs2 into the following equations (8) and (9):

$$\vec{M} = \vec{BP}_{s1} - \vec{BP}_{s2} \quad (8)$$

$$\vec{M} = \frac{|SP_{s1x}|}{|\vec{M}|}(\vec{M})$$

$$\theta = a\tan 2(M(2), M(1)) - \frac{\pi}{2}. \quad (9)$$

Figure 9:
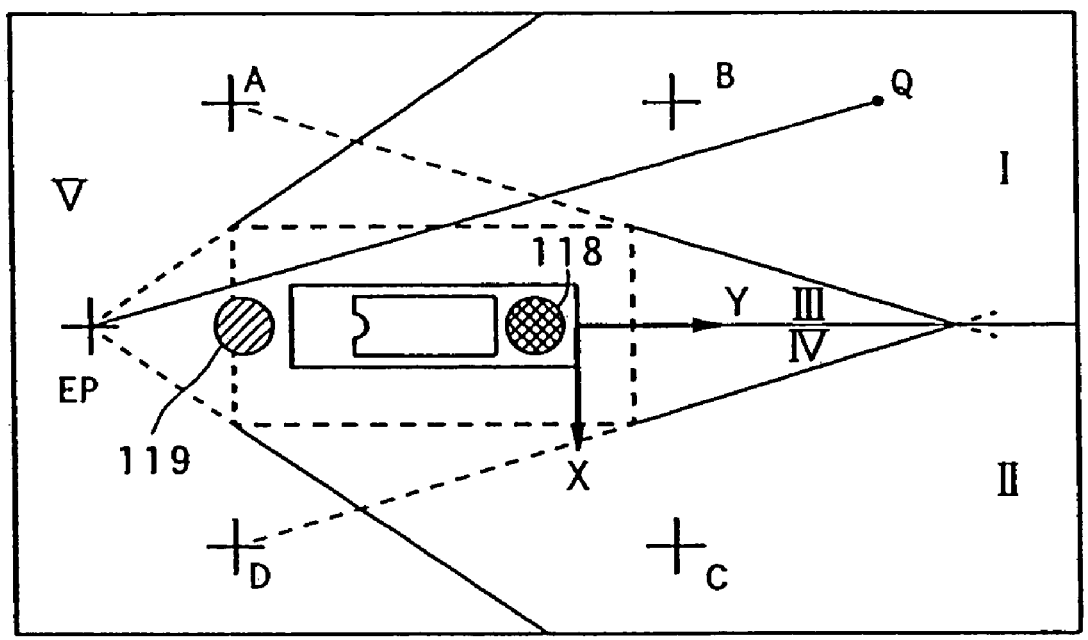
FIG. 9 shows an entrance point and a passage point.

The path determining processing is the processing of determining the proceeding path of the robot apparatus by which the robot apparatus may efficiently get to an entrance point EP of the electrical charger 100. The entrance point EP is a position suited for the robot apparatus 1 to proceed to the electrical charger 100, and is set towards the rear end of the electrical charger 100. FIG. 9 shows the entrance point EP of the electrical charger 100 and passage points of the robot apparatus 1. In FIG. 9, there is shown a rectangular area delimited by dots. This area is determined depending on the width of the robot apparatus 1, referred to below as a contact area. If the center of gravity of the robot apparatus 1 is intruded into this area, the robot apparatus 1 is contacted with the electrical charger 100.

More specifically, supposing that the robot apparatus 1 is located at a position Q in FIG. 9, and the robot apparatus proceeds directly from the point Q to the entrance point EP, the proceeding path of the robot apparatus 1 is a straight line interconnecting the point Q and the entrance point. If the robot apparatus 1 is moved along this straight line, the robot apparatus 1 is intruded into the contact area, thus being contacted with the electrical charger 100.

Thus, in the proceeding processing, the area around the electrical charger 100 is divided into five areas of from I to V and paths of detour are set depending on the position where the robot apparatus 1 is located. If the robot apparatus 1 is located in the area I, the robot apparatus 1 tries to pass through the passage point A to proceed towards the entrance point EP. If the robot apparatus 1 is located in the area II, the robot apparatus 1 passes through the passage point D to proceed towards the entrance point EP.

If the robot apparatus 1 is located in the area III, and tries to proceed to the passage point A, the robot apparatus is intruded into the contact area and is contacted with the electrical charger 100. Thus, if the robot apparatus 1 is located in the area III, the robot apparatus passes through the passage point B and subsequently proceeds to the passage point A and then to the entrance point EP. If the robot apparatus 1 is located in the area IV, and tries to proceed to the passage point D, the robot apparatus is contacted with the electrical charger 100. Thus, if the robot apparatus 1 is located in the area IV, it proceeds towards the entrance point EP through the passage points C and D. Thus, the robot apparatus 1 is moved along the selected proceeding path until it reaches the entrance point EP.

Figure 10:
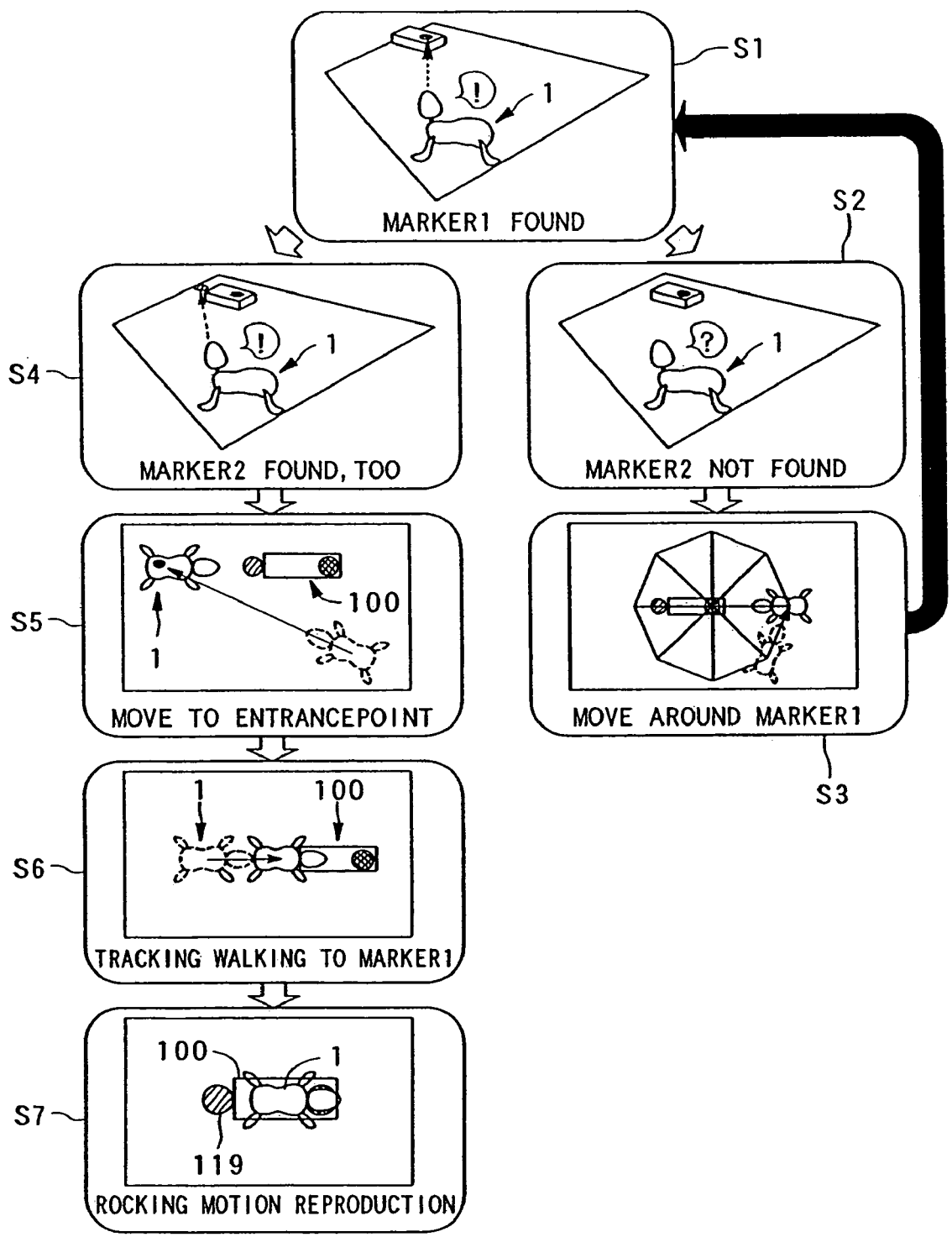
FIG. 10 schematically shows the operation of a robot apparatus in automatic electrical charging.

The operation of the robot apparatus in the autonomous electrical charging is explained with reference to FIG. 10, which schematically shows the operation of the robot apparatus 1. When the residual battery capacity is about to be depleted, the robot apparatus 1 begins its automatic electrical charging processing. On starting its automatic electrical charging processing, the robot apparatus 1 first commences the main marker search processing to take-in images of various spatial areas as it moves its neck or legs. On finding the main marker 118 in a step S1, the robot apparatus 1 searches whether or not the color information proper to the sub-marker 119 is contained in the image containing the main marker 118. If the color information proper to the sub-marker 119 is not contained in the photographed image (step S2), the sub-marker search processing is initiated. Thus, the robot apparatus 1 makes the round of the apex points of the regular octagon, centered about the main marker 118, until the robot apparatus gets to a position from which the robot apparatus may view the sub-marker 119 (step S3).

When both the main marker 118 and the sub-marker 119 are viewable (step S4), the robot apparatus 1 performs the processing of calculating the relative positions to calculate the relative position/angular between the robot apparatus and the electrical charger 100, and proceeds towards the entrance point EP of the electrical charger 100 by the proceeding processing (step S5). On getting to the entrance point EP, the robot apparatus 1 proceeds towards the robot apparatus support 111 (step S6). When the robot apparatus is snugly received in the robot apparatus support 111, it bends its four limbs 3A to 3D to have its battery connecting portion contacted with the connecting portion 115 of the electrical charger 100 for electrical charging (step S7) to terminate the automatic charging processing.

Figure 11:
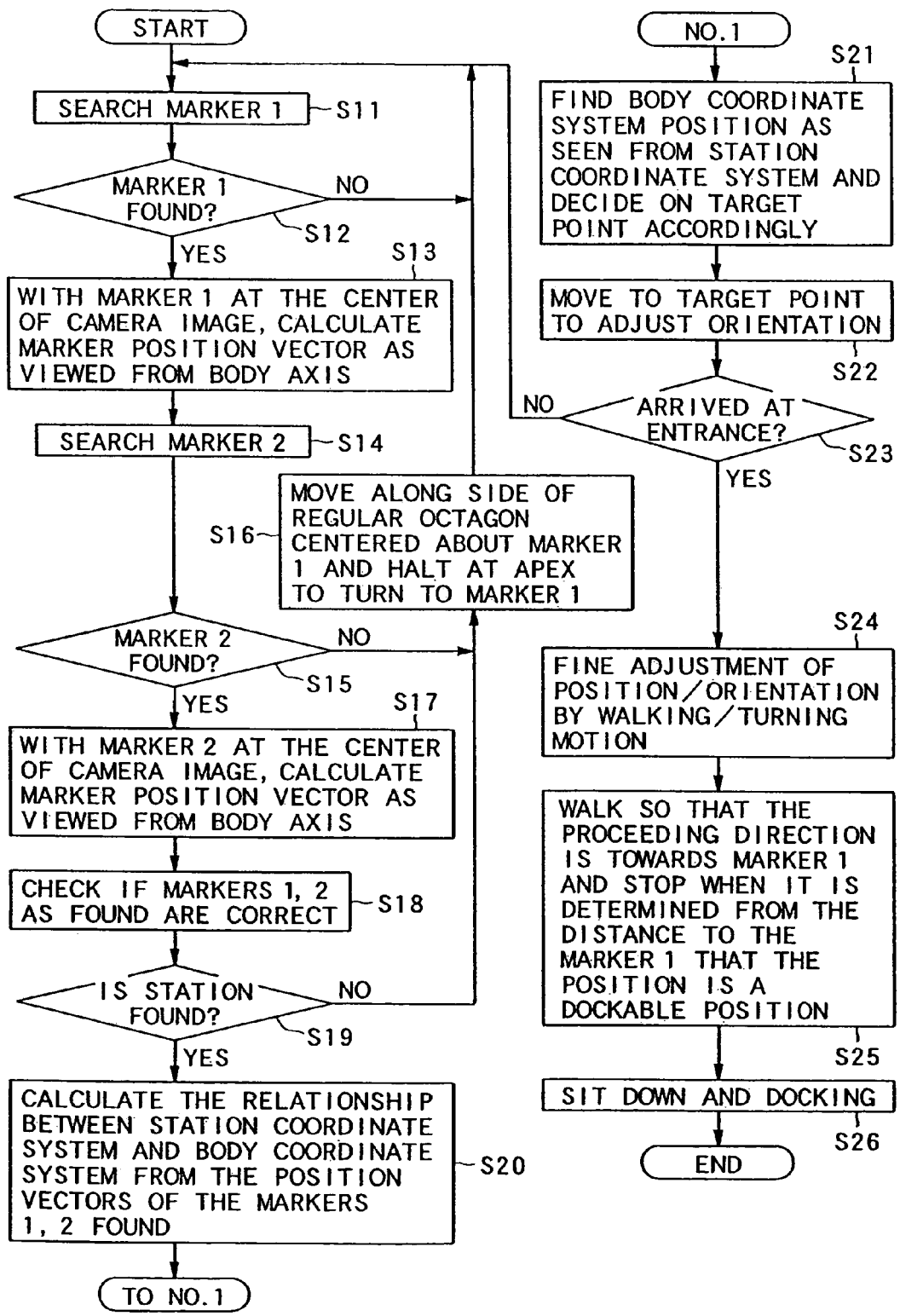
FIG. 11 is a flowchart showing automatic electrical charging.

The above-described sequence of operations is further explained, using the flowchart of FIG. 11. On startup of the automatic charging processing, the robot apparatus 1 first commences the main marker search processing and has the surrounding images photographed as it moves its neck or legs to make a search whether or not the color information proper to the main marker 118 is included in the photographed images (step S11). If the information proper to the main marker 118 is found (step S12), the the robot apparatus moves its neck or the legs to adjust the position of the CCD camera 20 so that the entire main marker 118 will be demonstrated in the image.

The reason for having the main marker 118 demonstrated in its entirety in the image is that it becomes thereby possible to find the centroid of the main marker 118 in the taken-in image. It is therefore unnecessary for the main market 118 to be arranged in the center of the image in the strict sense of the term. It is however desirable, for diminishing the distortion of the lens of the CCD camera 20, to adjust the position of the CCD camera 20 so that the main marker 118 is arranged at a location as close to the center of the image as possible.

When the position of the CCD camera 20 has been adjusted so that the main marker 118 in its entirety is demonstrated in the image, the robot apparatus 1 executes the distance calculating processing for calculating the position vector of the main marker 118. Under the effect of neck control of the robot apparatus 1, it takes some time until the position vector of the main marker 118 is converged. Thus, the robot apparatus 1 calculates the position vector of the main marker 118 from one frame output from the CCD camera 20 to another, to calculate the differential norm which is the difference between the norms of the consecutive position vectors. Using this differential norm, the robot apparatus 1 calculates the proper position vector. The condition used in adopting the position vector is that the position vector shall be the one calculated after lapse of 64 frames as from the visual recognition of the main marker 118 and that the differential norm of the position vector shall be convered within 1 mm for not less than five frames.

Figure 12:
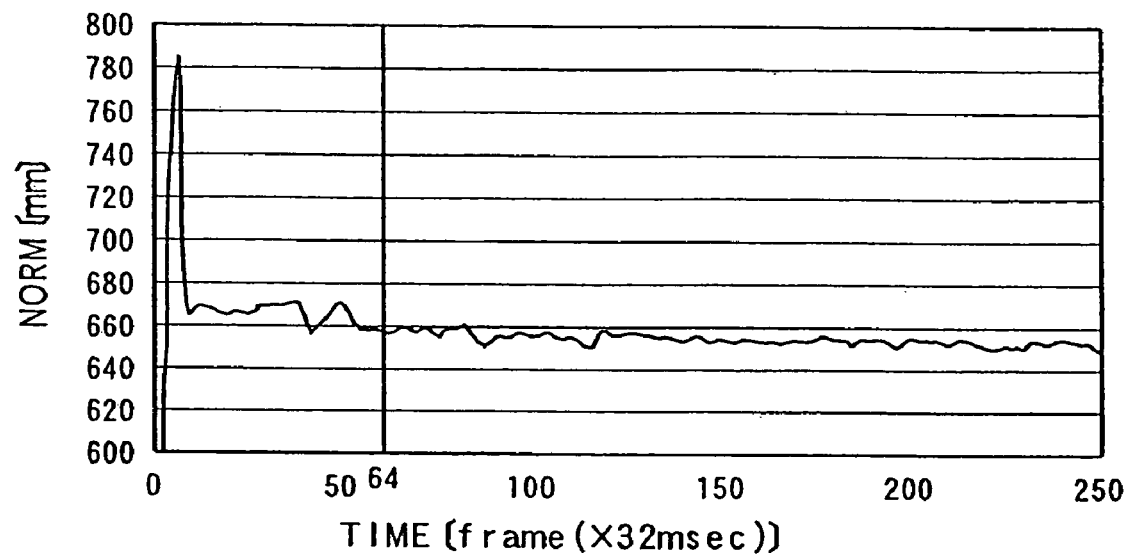
FIG. 12 illustrates the relationship between the norm of the position vector and the number of frames.
Figure 12:
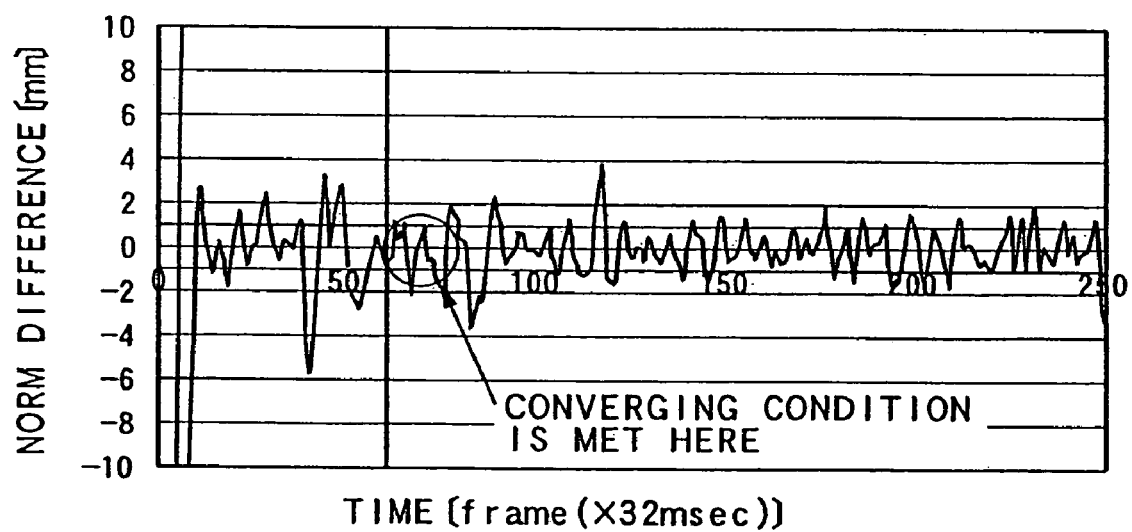

FIG. 12 upper depicts a graph showing the relationship between the norm of the position vector and the number of frames after visual recognition of the position vector, while FIG. 12 lower depicts a graph showing the relationship between the differential norm of the position vector and the number of frames after visual recognition of the position vector. In FIG. 12 lower, the portion of the graph enclosed in a circle satisfies the condition that 64 frames have passed and that the norm difference of the position vector converges to 1 mm or less for not less than five frames. Thus, by adopting the position vector, calculated within the portion surrounded by the circle, as the correct position vector, it is possible to avoid the detection error caused by the instabilities in neck control to obtain the position vector with high reliability (step S13).

The robot apparatus 1 then actuates a neck to take in the surrounding image to search whether or not the color information of the sub-marker 119 is contained in the taken-in image information (step S14). If the sub-marker 119 has not been found in the position which has visually recognized the main marker 118 (step S15: NO) the robot apparatus 1 begins the sub-marker search processing to travel along the sides of the regular octagon centered about the main marker 118 (step S16) to execute the processing of step S11.

The robot apparatus 1, which has visually recognized the sub-marker 119 (step S17), finds, from the position vector difference between the main marker 118 and the sub-marker 119, the distance between the main marker 118 and the sub-marker 119, and compares the distance between the main marker 118 and the sub-marker 119 stored in the robot apparatus to the calculated distance, to make a check whether or not the robot apparatus 1 has made mis-recognition of the markers 118, 119 (step S18).

That is, the distance between the main marker 118 and the sub-marker 119 is fixed, so that, if the robot apparatus 1 has recognized an object other than the marker as being a marker, the distance between the main marker 118 and the sub-marker 119 differs from the actual distance. Thus, if the distance between the main marker 118 and the sub-marker 119 is not comprised within a preset range (step S19: NO), the robot apparatus 1 recognizes that it has mis-recognized the marker and proceeds to step S11 to search the marker again. If the distance between the main marker 118 and the sub-marker 119 is comprised within a preset range, the robot apparatus 1 assumes that it is recognizing the correct marker (step S19: YES) and proceeds to the processing in a step S20.

In the step S20, the robot apparatus 1 executes the processing of calculating the relative positions to find the relative position/angle between the robot coordinate system. {b} and the station coordinate system {s} to shift to the processing in a step S21. Meanwhile, the coordinate transformation from the robot coordinate system {b} to the station coordinate system {s} may be facilitated by finding the relative position/angle between the robot coordinate system {b} and the station coordinate system {s}.

In a step S21, the coordinate of the point of origin B of the robot coordinate system {b} in the station coordinate system {s} is found and the value of this point of origin B is used to execute the proceeding processing. The proceeding processing is the processing of selecting the proceeding path which will not cause collision of the robot apparatus with the electrical charger 100. The robot apparatus 1 is moved along a proceeding path as determined by the proceeding processing (step S22) to reach the entrance point EP (step S23: YES). The robot apparatus 1, which has reached the entrance point EP, makes a turning movement until its body is oriented to a mid point between the main marker 118 and the sub-marker 119, to make fine adjustment of the position of the robot apparatus 1 (step S24).

If, in the step S23, the robot apparatus 1 has not reached the entrance point EP (step S23: NO), the processing transfers to the step S11 to re-initiate the search for the main marker 118.

If the position of the robot apparatus 1 has been determined, the robot apparatus 1 advances towards the electrical charger 100. At this time, the robot apparatus 1 calculates the distance between the main marker 118 and the robot apparatus 1, using the distance calculating processing. When the distance between the main marker 118 and the robot apparatus 1 is a preset distance, the movement of the robot apparatus 1 ceases (step S25).

The robot apparatus 1 then lowers its waist to contact the connecting portion of the battery 17 of the robot apparatus 1 with the contact portion of the electrical charger 100 (step S26). It is noted that the robot apparatus support 111 of the electrical charger 100 is bowl-shaped, such that, if the orientation or the position of the robot apparatus 1 is slightly offset from the normal orientation or position, the belly portion of the robot apparatus 1 may be correctly loaded accurately in the robot apparatus support 111.

By the above-described sequence of operations, the robot apparatus 1 recognizes that the residual battery capacity has become depleted, so that the robot apparatus 1 may proceed autonomously to the electrical charger 100 where it may be electrically charged. Thus, the robot apparatus 1 may keep on to be in operation, as long as the battery capacity allows, without the user having to offer his/her help.

If such processing is added which change the walking pattern of the robot apparatus until the robot apparatus gets to the electrical charger, responsive to the residual battery capacity, the robot apparatus may be caused to act as if it is rushing, thus improving its entertainment properties.

If the residual battery capacity is smaller, control may be made so that the robot apparatus will not be separated from the electrical charger. If conversely the robot apparatus is in the neighborhood of the electrical charger, control may be managed such that the robot apparatus will frequently perform brisk movements that may lead to accelerated battery consumption, even if the residual battery capacity is scanty.

Figure 13:
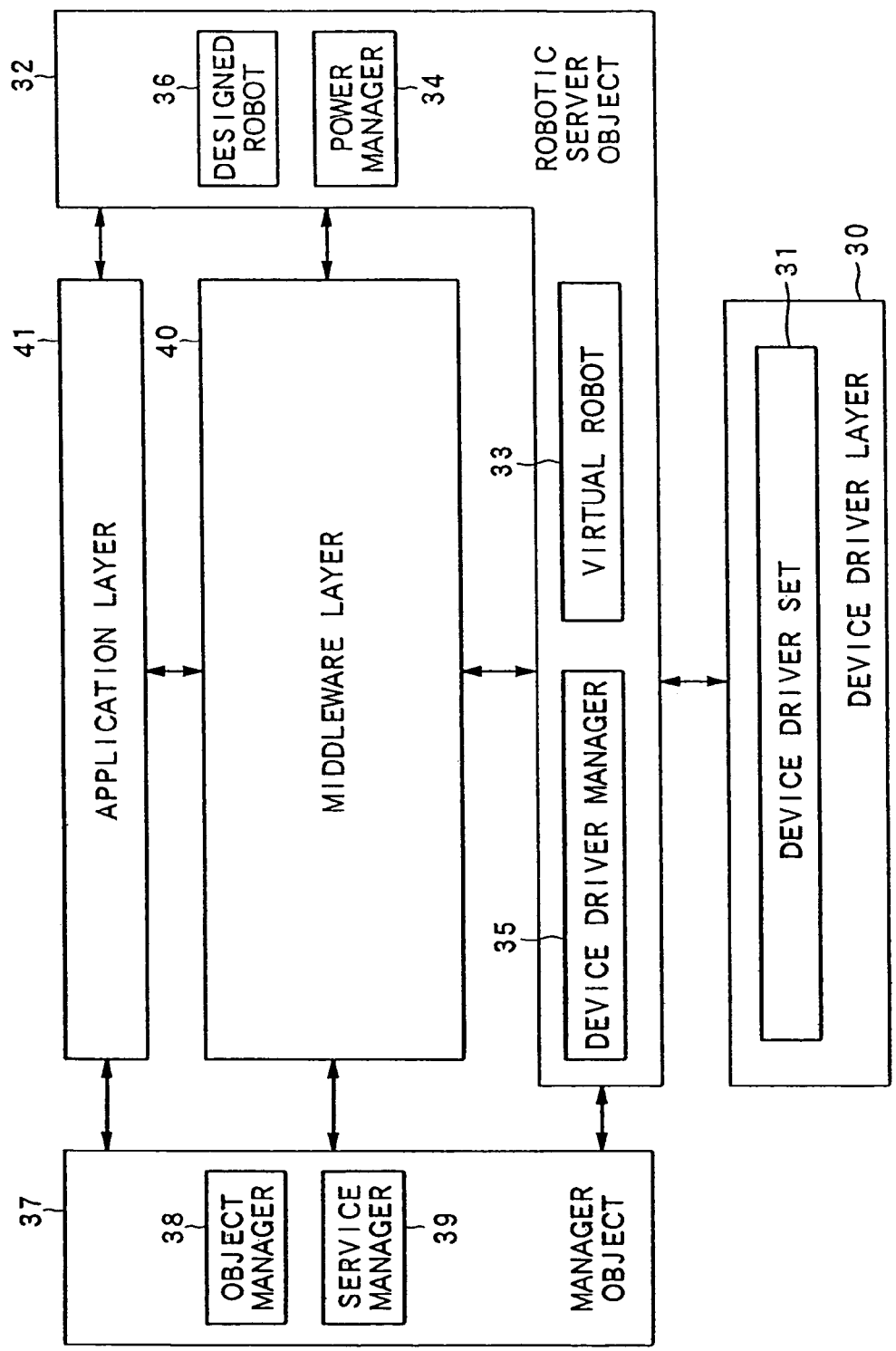
FIG. 13 shows the software structure of a control program in the robot apparatus.

The above-described sequence of operations is executed by the software which will be explained below. The software structure of the control program in the robot apparatus 1 is shown in FIG. 13, in which a device driver layer 30 is the lowermost layer of the control program, and is made up by a device driver set 31 comprised of plural device drivers. Each device driver is an object allowed to have direct access to the hardware used in an ordinary computer, such as one used in a CCD camera or a timer, and performs processing responsive to interrupt from the associated hardware.

A robotic server object 32 is a lowermost layer of the device driver layer 30, and is made up by a device driver manager 35, comprised of a software set providing an interface for accessing the hardware, such as various sensors or actuators, and a designed robot 36, made up by a software set, supervising the mechanism of the robot apparatus 1.

A manager object 37 is made up by an object manager 38 and a service manager 39. The object manager 38 is a software set supervising the booting or end of operation of the software included in the robotic server object 32, middleware layer 40 and an application layer 41, while the service manager 39 is a software set supervising the interconnection among the respective objects based on the connection information among the respective objects stated in a connection file stored in the memory card 28.

The middleware layer 40 is an upper layer of the robotic server object 32 and is made up by a software set providing the basic functions of the robot apparatus 1, such as picture or speech processing.

The application layer 41, on the other hand, is an upper layer of the middleware layer 40 and is made up by software set determining the behavior of the robot apparatus 1 based on the results of processing by the respective software sets making up the middleware layer 40.

Figure 14:
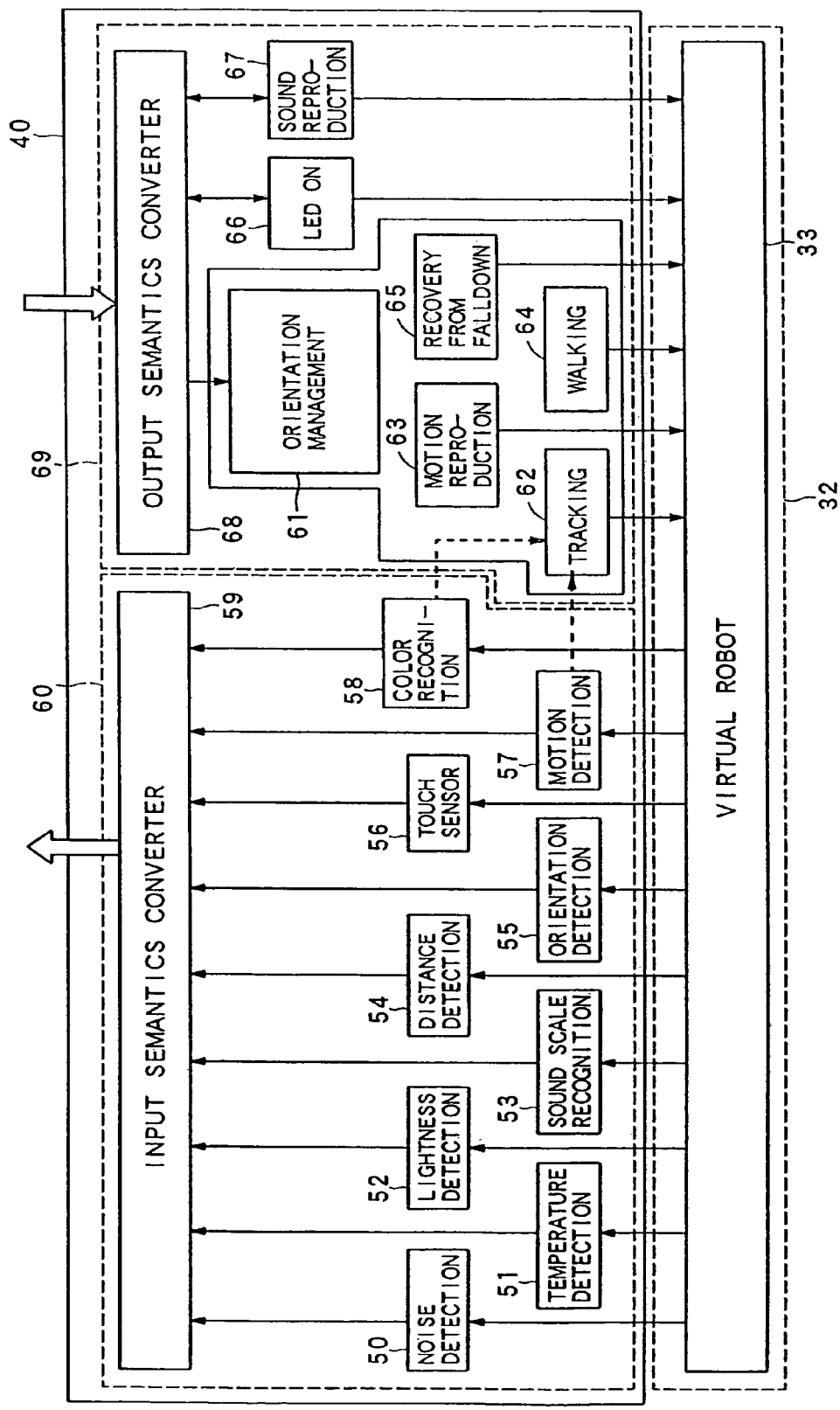
FIG. 14 shows the structure of a middleware layer in the software enclosed in the robot apparatus.

Referring to FIG. 14, the middleware layer 40 is made up by a recognition system 60 and a recognition system 69. The recognition system 60 includes a signal processing module 50 for noise detection 50 for noise detection, a signal processing module 51 for temperature detection, a signal processing module 52 for lightness detection, a signal processing module 53 for a sound scale recognition, a signal processing module 54 for distance detection, a signal processing module 55 for orientation detection, a signal processing module 56 for a touch sensor, a signal processing module 57 for motion detection, a signal processing module 58 for color recognition, and an input semantics converter module 59, while the recognition system 69 includes an output semantics converter module 68, a signal processing module 61 for orientation management, a signal processing module 62 for tracking, a signal processing module 63 for motion reproduction, a signal processing module 64 for walking, a signal processing module 65 for recovery from falldown, a signal processing module 66 for LED lighting, and a signal processing module 67 for sound reproduction.

The respective signal processing modules 50 to 58 of the recognition system 60 take in relevant ones of the sensor data, picture data and the speech data, read out from the DRAM 11 by the virtual robot 33 of the robotic server object 32 and perform preset processing on the so taken-in data to send the processed result to the input semantics converter module 59. For example, the virtual robot 33 is designed as a component responsible for transmitting/receiving or converting signals, under a preset communication protocol.

Based on the processed results applied from these signal processing modules, the input semantics converter module 59 recognizes its own state, surrounding state, command from the user or the action by the user, such as [noisy], [hot], [bright], [a ball detected], [a falldown detected], [stroked], [patted], [the sound scales of do, mi and so on heard], [a moving object detected], or [an obstacle detected], and outputs the recognized results to the application layer 41.

Figure 15:
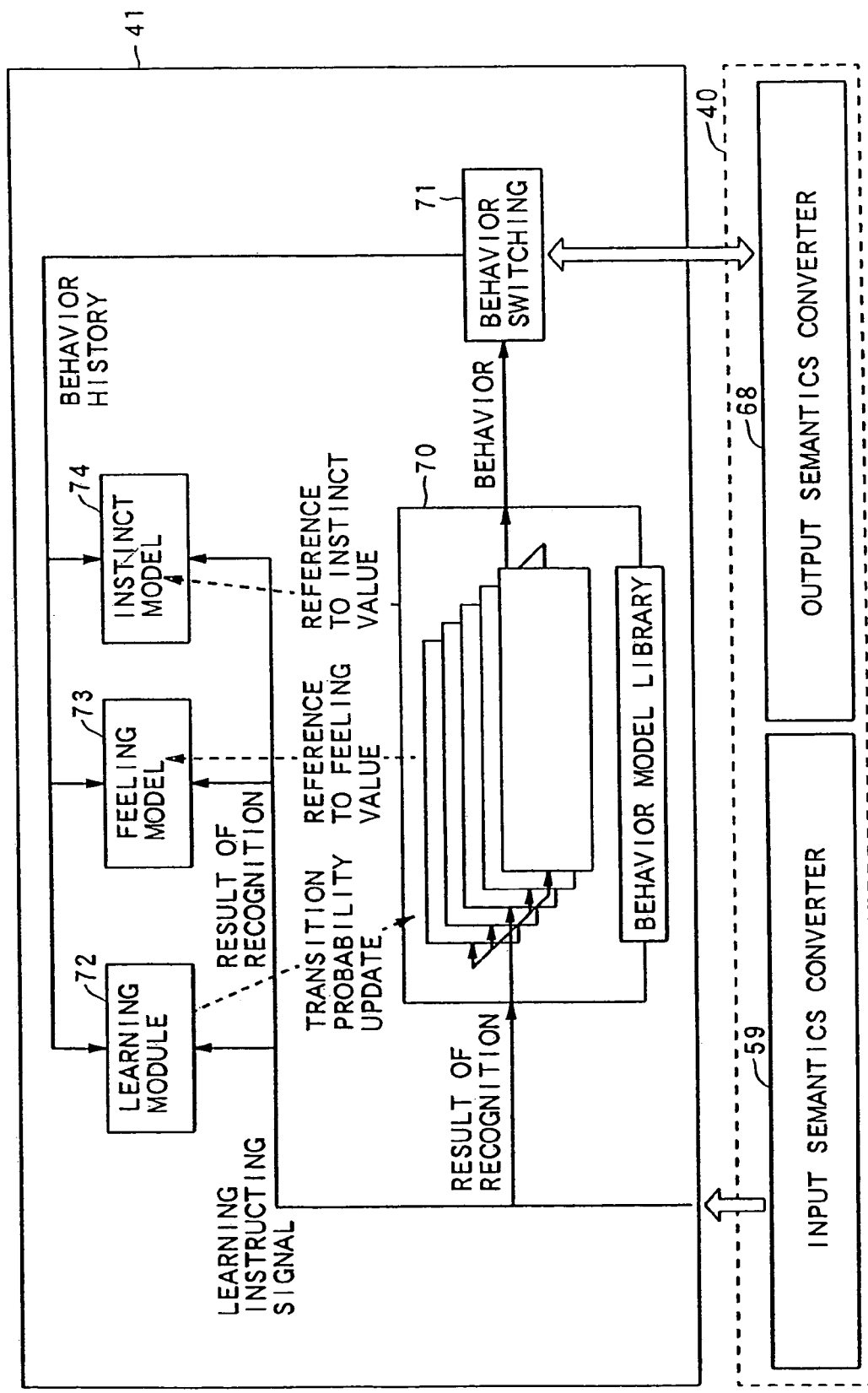
FIG. 15 shows the structure of an application layer in the software enclosed in the robot apparatus.

Referring to FIG. 15, the application layer 41 is made up by five modules, namely a behavior model library 70, an behavior switching module 71, a learning module 72, a feeling model 73 and an instinct model 74.

Figure 16:
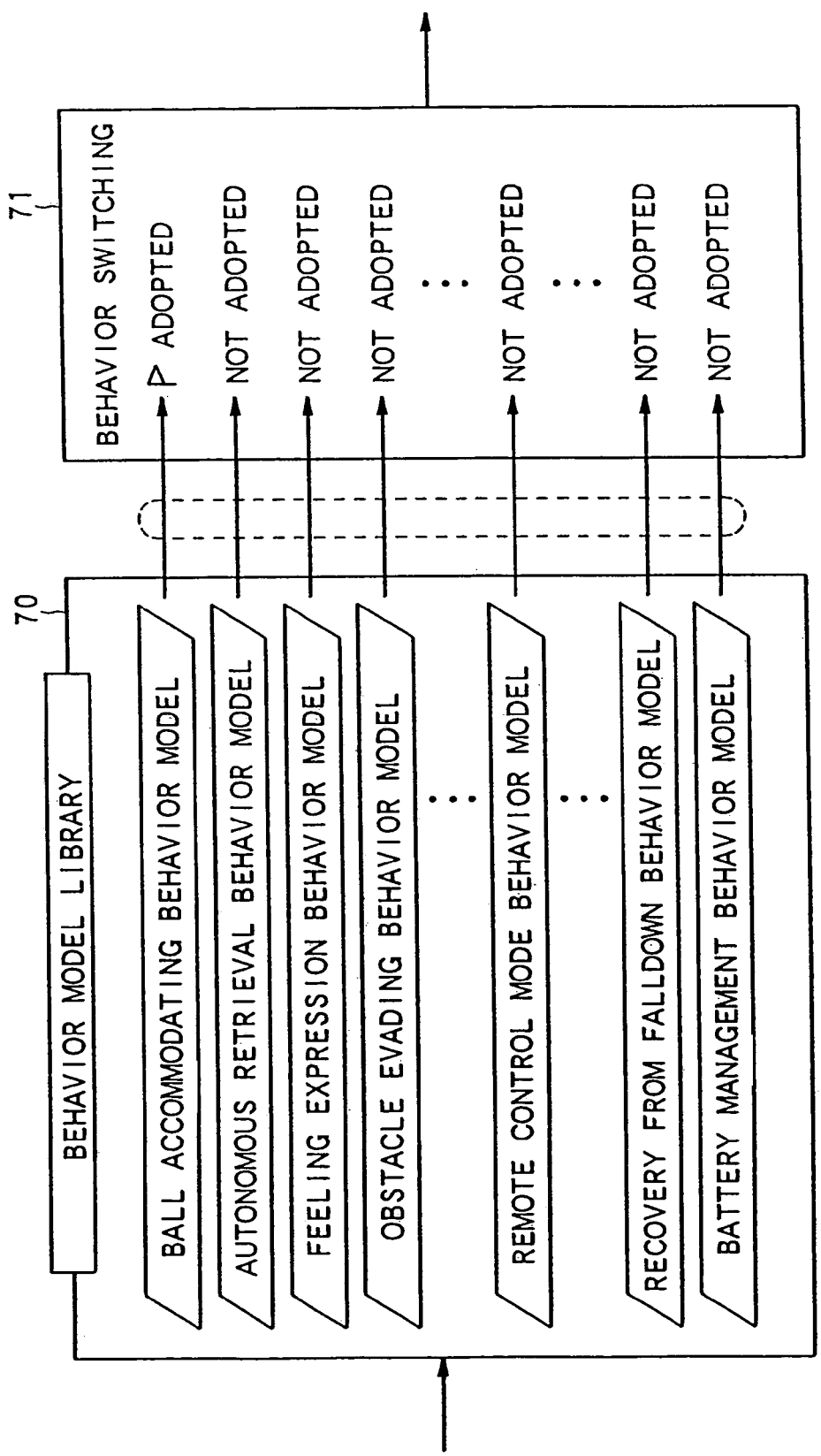
FIG. 16 shows the structure of a behavior model library in the software enclosed in the robot apparatus.

In the behavior model library 70, there are provided, as shown in FIG. 16, independent behavior models $70_1$ to $70_n$ in association with several pre-selected conditional items, such as [case where residual battery capacity is diminished], [recovery from the falldown state], [case where an obstacle is to be avoided], [case where a feeling is to be expressed] or [case where a ball has been detected].

When the results of the recognition are given from the input semantics converter module 59 or when a preset time has elapsed from the time the last result of recognition was given, the above behavior models $70_1$ to $70_n$ decide on the next behaviors to be taken, as reference is had to parameter values of the associated emotions stored in the feeling model 73 or to parameter values of the associated desires held in the instinct model 74 to output the determined results to the behavior switching module 71.

Figure 17:
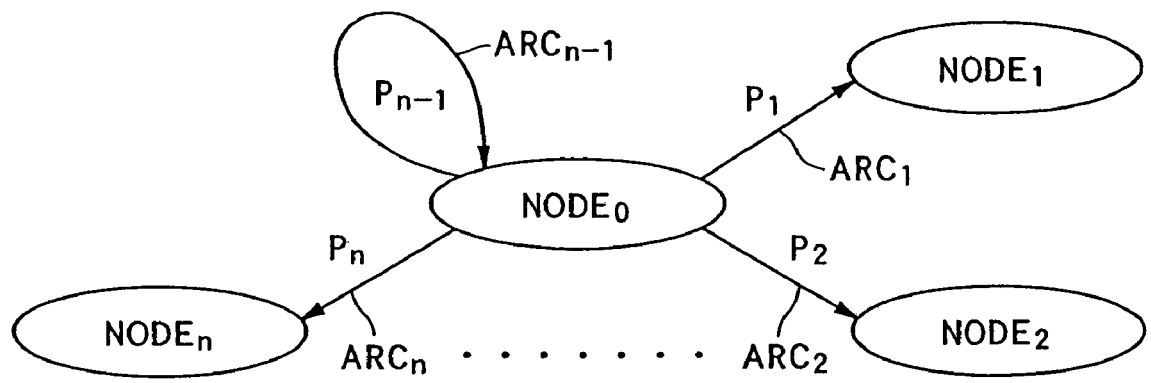
FIG. 17 is a status transition diagram for determining the behavior of the robot apparatus.

In the present embodiment, the respective behavior models $70_1$ to $70_n$ use an algorithm, termed finite probability automaton, as a technique for determining the next behaviors, as shown in FIG. 17. This algorithm is such a one in which the next one of the other nodes $NODE_0$ to $NODE_n$ to which transfer is to be made from one of the nodes $NODE_0$ to $NODE_n$ is probabilistically determined based on the transition probability values $P_1$ to $P_n$ as set for each of the arcs $ARC_1$ to $ARC_n$ interconnecting the respective: nodes $NODE_0$ to $NODE_n$.

Specifically, the respective behavior models $70_1$ to $70_n$ each include a status transition table 80, forming its own behavior model, for each of the nodes $NODE_0$ to $NODE_n$, each in association with the nodes $NODE_0$ to $NODE_n$, as shown in FIG. 18.

In this status transition table 80, input events (results of the recognition), representing the conditions of transition in a given node are entered in the column of the [input event name] in the order of the falling priority, and further conditions for the transition conditions are entered in the relevant rows of columns of the [data name] and [data range].

Thus, in the node $NODE_{100}$, represented in the status transition table 80 of FIG. 18, given the results of the recognition of [ball detected], the ball [size] being in a range [from 0 to 1000], which is afforded along with the results of the recognition, represents the condition for transition to the other node. In similar manner, given the results of the recognition of [obstacle detected], the [distance] to the obstacle, afforded along with the results of the recognition, being in a range [from 0 to 100], represents the condition for transition to the other node.

Moreover, if, in this node $NODE_{100}$, there is no input of the results of recognition, but any of the values of the parameters [boy], [surprise] and [sadness], held by the feeling mode 173, among the parameters of the emotions and desires, held by the feeling model 73 and the instinct model 74, periodically referenced by the behavior models $70_1$ to $70_n$, is in a range from [50 to 100], transition may be made to the other node.

In the status transition table 80, the names of the nodes, to which transition may be made from the node $NODE_0$ to node $NODE_n$, are entered in the row [node of destination of transition] in the column [transition probability to the other node], while the transition probabilities to the other node of the node $NODE_0$ to $NODE_n$, to which transition may be made when all the conditions entered in the columns of the [input event name], [data name] and [data range] are met, are entered in the relevant cells of the column [transition probability to the other node]. Also entered in the row [output behavior] in the column [transition probability to the other node] are the behaviors to be output in making transition to the other of the nodes $NODE_0$ to $NODE_n$.

Meanwhile, the sum of the probabilities of the respective rows in the column [transition probability to the other node] is 100%.

Thus, in the node $NODE_{100}$, indicated in the status transition table 80 of FIG. 18, if the results of the recognition are such that the [ball is detected] and the [size] of the ball is in a range from [0 to 1000], transition may be made to the [node $NODE_{120}$] at a probability of [30%] and the behavior [ACTION 1] is taken at this time.

Each behavior model $70_1$ to $70_n$ is constructed that a number of the nodes $NODE_0$ to the node $NODE_n$, stated in the status transition table 80, are concatenated, such that, when the results of the recognition are afforded from the input semantics converter module 59, the next behavior is determined probabilistically by exploiting the status transition table of the corresponding nodes $NODE_0$ to $NODE_n$, with the results of the decision being output to the behavior switching module 71.

The behavior switching module 71, shown in FIG. 15, selects the output behavior from the behaviors output from the behavior models $70_1$ to $70_n$ of the behavior model library 70 so that the behavior selected is one output from the predetermined behavior model with the highest rank in the priority order. The behavior switching module 71 sends a command for executing the behavior, referred to below as the behavior command, to an output semantics converter module 68 of the middleware layer 40. Meanwhile, in the present embodiment, the behavior models shown in FIG. 16 becomes higher in the descending direction in the drawing.

Based on the behavior completion information, afforded from the output semantics converter module 68 after the end of the behavior, the behavior switching module 71 informs the learning module 72, feeling model 73 and the instinct model 74 of the end of the behavior.

The learning module 72 inputs the results of the recognition of the instructions, received as the action from the user, such as [patting] or [stroking], among the results of the recognition afforded from the input semantics converter module 59.

Based on the results of the recognition and on the notice from the behavior switching module 71, the learning module 72 changes the corresponding transition probability of the corresponding one of the behavior models $70_1$ to $70_n$ in the behavior model library 70 for lowering and raising the probability of occurrence of the behavior in case of patting (scolding) and stroking (praising), respectively.

On the other hand, the feeling model 73 holds parameters indicating the intensity of each of six emotions of [joy], [sadness], [anger], [surprise], [disgust] and [fear]. The feeling model 73 periodically updates the parameter values of these emotions based on the specified results of the recognition afforded by the input semantics converter module 59, such as [patting] or [stroking], time elapsed and on notices from the behavior switching module 71.

Specifically, the feeling model 73 calculates, based on the results of the recognition supplied from the input semantics converter module 59, the behavior of the robot apparatus 1 at this time and on the time elapsed since the previous update operation, a parameter value E[t+1] of a given emotion in the next period by the equation (10):

$$E[t+1]=E[t]+k_e \times \Delta E[t] \qquad (10)$$

where $\Delta E(t)$ is the variation of the emotion as calculated by a preset equation for calculation, E[t] is the current parameter value of the emotion, and $k_e$ is the coefficient representing the sensitivity of the emotion, and substitutes the parameter value E[t+1] for the current parameter value of the emotion E[t] to update the parameter value of the emotion. The feeling model 73 also updates the parameter values of the totality of the emotions in similar manner.

Meanwhile, to which extent the results of the recognition or the notice from the output semantics converter module 68 affect the amount of the variation $\Delta E[t]$ of the parameter values of the respective emotions is predetermined, such that the results of the recognition [being patted] seriously affect the amount of the variation $\Delta E[t]$ of the parameter value of the emotion [anger], while the results of the recognition [being stroked] seriously affect the amount of the variation $\Delta E[t]$ of the parameter value of the emotion [joy].

It is noted that the notice from the output semantics converter module 68 is what may be called the feedback information of the behavior (behavior end information), that is the information concerning the results of the occurrence of the behavior, and that the feeling model 73 changes its emotion by this information. For example, the behavior of [barking] lowers the feeling level of anger.

Meanwhile, the notice from the output semantics converter module 68 is also input to the learning module 72 such that the learning module 72 changes the corresponding transition probability of the behavior models $70_1$ to $70_n$ based on such notice. Meanwhile, the feedback of the results of the behavior may be made by the output of the behavior switching module 71 (behavior added by the feeling).

The instinct model 74 holds parameters, indicating the strength of four independent desires, for example, the [desire for exercise], [desire for affection], [appetite] and [curiosity]. Based on the results of the recognition afforded by the input semantics converter module 59, time elapsed and on the notice from the behavior switching module 71; the instinct model 74 periodically updates the parameters of these desires.

Specifically, the instinct model 74 updates, for the [desire for exercise], [desire for affection] and [curiosity], based on the results of the recognition, time elapsed and on the notice from the output semantics converter module 68, the parameter value of the desire in question by calculating, at a preset period, a parameter value for the desire in question I[k+1] for the next period, using the following equation (11):

$$I[k+1]=I[k]+k_i \times \Delta I[k] \qquad (11)$$

where ΔI[k] is the amount of the variation of the desire as calculated by a preset equation for calculation, I[k] is the current parameter value of the desire in question and $k_i$ is the coefficient expressing the sensitivity of the desire in question, and by substituting the results of the calculation for the current parameter value I[k] of the desire in question, the parameter value of the desire in question is updated. In similar manner, the instinct model 74 updates the parameter values of the respective desires different than the [appetite].

Meanwhile, to which extent the results of the recognition and the notice from the output semantics converter module 68 affect the amount of the variation ΔI[k] of the parameter values of the respective desires is predetermined, such that the results of the recognition seriously affects the amount of the variation ΔI[k] of the parameter value of the [fatigue].

In the present embodiment, the parameter values of the respective emotions and desires (instincts) are controlled to be varied in a range from 0 to 100, while the values of the coefficients $k_e$ and $k_i$ are set from one emotion to another and from one desire to another.

On the other hand, the output semantics converter module 68 of the middleware layer 40 gives abstract behavioral commands afforded by the behavior switching module 71 of the application layer 41, such as [advance], [joy], [speak] or [tracking (track a ball)], to the signal processing modules 61 to 67 of the output system 69, as shown in FIG. 14.

If a behavioral command is issued, the signal processing modules 61 to 67 generates data such as servo command values, based on the behavioral command, which are to be supplied to the associated actuator $25_1$ to $25_n$ for performing the behavior, to send these values or data to the associated actuator $25_1$ to $25_n$, through the virtual robot 33 of the robotic server object 32 and the relevant signal processing circuit 14.

The signal processing modules 61 to 67 generate speech data of the sound output from the loudspeaker 24 and/or data pertinent to the operation of the LED operating as an [eye] to send these data sequentially to the loudspeaker 24 or the LED through the virtual robot 33 of the robotic server object 32 and the relevant signal processing circuit 14.

In this manner, the robot apparatus 1 is able to perform autonomous behavior, responsive to its own inner status, surrounding (external) status and commands or actions from the user, based on the aforementioned control program.

While the invention has been described in accordance with certain present embodiments thereof illustrated in the accompanying drawings and described in the above description in detail, it should be understood by those ordinarily skilled in the art that the invention is not limited to the embodiments, but various modifications, alternative constructions or equivalents can be implemented without departing from the scope and the spirit of the present invention as set forth and defined in the appended claims.

What is claimed is:

1. An electrical charging controlling method for an electrical charging system including a robot apparatus and an electrical charging device, said robot apparatus having movement means and a built-in power supply unit for driving and adapted for acting autonomously responsive to an inner state thereof, said electrical charging device electrically charging said power supply unit, said controlling method comprising the steps of:

pr e-storing the information on the position of at least one marker;

a position vector calculating step of calculating the distance and the direction to said marker from an image of said marker provided to an electrical charging device, photographed by said imaging step and from information on the position of said marker pre-stored in storage means; and performing control by driving said movement means for causing movement of said robot apparatus towards said electrical charging device depending on the calculated distance and direction to said marker, wherein said at least one marker comprises a main marker and a sub marker, the main marker is provided at an uppermost location of the electrical charging device and the sub marker is provided at a rear end of the electrical charging device.

* * * * *